(12) United States Patent
Chung

(10) Patent No.: US 11,782,646 B2
(45) Date of Patent: Oct. 10, 2023

(54) MEMORY DEVICE AND MEMORY SYSTEM HAVING THE MEMORY DEVICE

(71) Applicant: SK hynix Inc., Icheon-si (KR)

(72) Inventor: Seung Hyun Chung, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 42 days.

(21) Appl. No.: 17/580,222

(22) Filed: Jan. 20, 2022

(65) Prior Publication Data

US 2023/0069423 A1 Mar. 2, 2023

(30) Foreign Application Priority Data

Aug. 30, 2021 (KR) .................. 10-2021-0115135

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0673* (2013.01)

(58) Field of Classification Search
CPC ...... G06F 3/0659; G06F 3/0604; G06F 3/064; G06F 3/0673
See application file for complete search history.

(56) References Cited

U.S. PATENT DOCUMENTS

| 10,153,046 | B1 * | 12/2018 | Agarwal | G11C 16/10 |
| 2015/0187442 | A1 * | 7/2015 | Sivasankaran | G11C 29/82 |
| | | | | 365/185.09 |
| 2016/0055918 | A1 * | 2/2016 | Kochar | G11C 16/0483 |
| | | | | 365/185.11 |
| 2018/0088823 | A1 * | 3/2018 | Ramalingam | G11C 29/44 |

FOREIGN PATENT DOCUMENTS

| KR | 100576820 B1 | 5/2006 |
| KR | 1020200039544 A | 4/2020 |

* cited by examiner

*Primary Examiner* — Edward J Dudek, Jr.
(74) *Attorney, Agent, or Firm* — WILLIAM PARK & ASSOCIATES LTD.

(57) ABSTRACT

Provided herein may be a memory device and a memory system having the memory device. The memory system includes a memory device including a plurality of memory blocks, each including chunk blocks, and page buffer blocks respectively coupled to the chunk blocks, and a memory controller configured to, based on chunk block status information indicating whether each of the chunk blocks is one of a pass chunk block and a bad chunk block, control the memory device to perform an operation corresponding to a command on merged pass chunk blocks obtained by merging pass chunk blocks coupled to different page buffer blocks among pass chunk blocks included in memory blocks, each of the memory blocks including both the pass chunk block and the bad chunk block.

19 Claims, 15 Drawing Sheets

MEMORY DEVICE AND MEMORY SYSTEM HAVING THE MEMORY DEVICE

CROSS-REFERENCE TO RELATED APPLICATION

The present application claims priority under 35 U.S.C. § 119(a) to Korean patent application number 10-2021-0115135, filed on Aug. 30, 2021, in the Korean Intellectual Property Office, the entire disclosure of which is incorporated herein by reference.

BACKGROUND

1. Technical Field

Various embodiments of the present disclosure relate to an electronic device, and more particularly to a memory device and a memory system having the memory device.

2. Related Art

A memory system is a device which stores data under the control of a host system such as a computer or a smartphone. The memory system may include a memory device which stores data and a memory controller which controls the memory device. Memory devices may be classified into a volatile memory device and a nonvolatile memory device.

The volatile memory device may be a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

An embodiment of the present disclosure may provide for a memory system. The memory system may include a memory device including a plurality of memory blocks, each including chunk blocks, and page buffer blocks respectively coupled to the chunk blocks, and a memory controller configured to, based on chunk block status information indicating whether each of the chunk blocks is a pass chunk block or a bad chunk block, control the memory device to perform an operation corresponding to a command on merged pass chunk blocks obtained by merging pass chunk blocks coupled to different page buffer blocks among pass chunk blocks included in memory blocks, each of the memory blocks including both the pass chunk block and the bad chunk block.

An embodiment of the present disclosure may provide for a memory device. The memory device may include a plurality of memory blocks, each including chunk blocks, each of the chunk blocks including one of a pass chunk block and a bad chunk block, page buffer blocks coupled to the chunk blocks, respectively, an address decoder configured to apply an operating voltage to a memory block selected from among the plurality of memory blocks, a block register configured to store a block address corresponding to merged pass chunk blocks obtained by merging pass chunk blocks coupled to different page buffer blocks, among pass chunk blocks included in memory blocks, each including both the pass chunk block and the bad chunk block, and an operation controller configured to, when a command and the block address are received from a memory controller, control the address decoder to apply an operating voltage corresponding to the command to the merged pass chunk blocks selected by the block address.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure are directed to a memory device that is capable of increasing the available capacity of a memory block and a memory system having the memory device.

Figure 1:
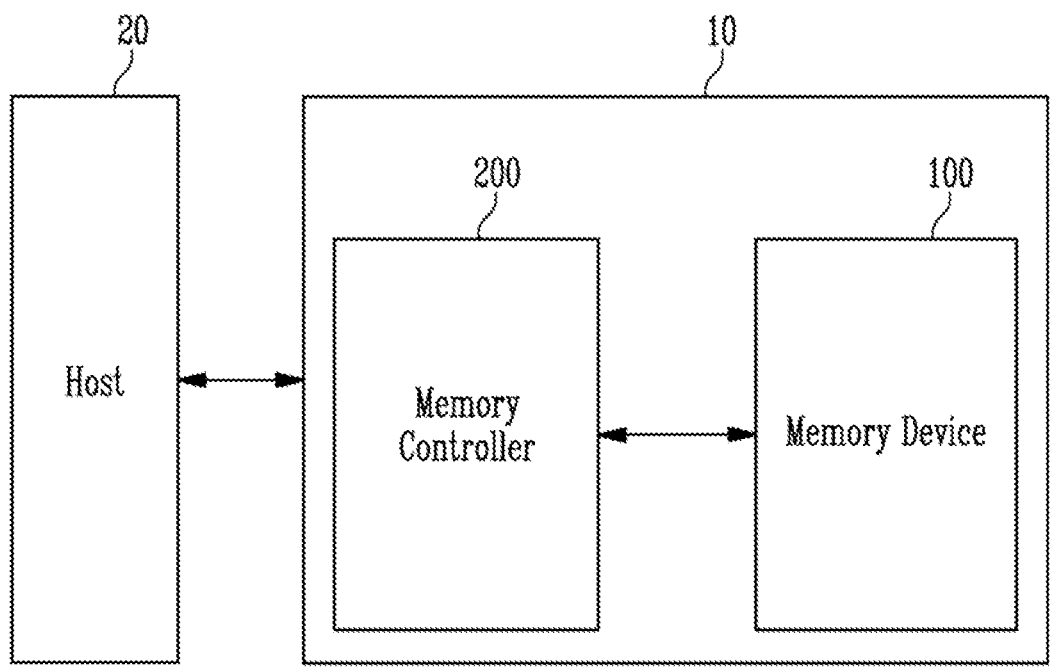
FIG. 1 is a diagram illustrating a memory system according to an embodiment.

FIG. 1 is a diagram illustrating a memory system according to an embodiment.

Referring to FIG. 1, a memory system 10 according to an embodiment of the present disclosure may include a memory device 100 and a memory controller 200.

The memory system 10 may perform an operation corresponding to a request received from a host system 20 in response to the request. For example, the memory system 10 may store data received from the host system 20. The memory system 10 may provide the stored data to the host system 20. The memory system 10 may erase stored data. For this, the memory system 10 may be coupled to the host system 20 though various communication methods.

The memory system 10 may be classified as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick, depending on the communication protocol or data storage scheme.

The host system 20 may be one of various electronic devices, such as a desktop computer, a laptop computer, a mobile phone, a smartphone, a game console, a television (TV), a tablet computer, and a wearable device. The host system 20 may request the memory system 10 to store data, read data or erase data through communication complying with various communication protocols. The host system 20 may receive read data or the like from the memory system 10. Here, the host system 20 may be briefly referred to as a 'host.'

The memory system 10 may include the memory device 100 and the memory controller 200. Here, the number of memory devices 100 may be one or more. The memory device 100 and the memory controller 200 may be coupled to each other through a channel through which a command, an address or data may be exchanged.

The memory device 100 may include a plurality of memory blocks. One memory block may include a plurality of memory cells. Here, a memory cell may be a semiconductor memory device which stores bitwise data.

One memory block may include a plurality of pages. One page may include a plurality of memory cells. Each memory cell may denote the unit of data. For example, one memory cell may store charge, and a threshold voltage of the corresponding memory cell may change depending on the amount of charge. A program state to which the threshold voltage of the corresponding memory cell belongs indicates the bit value of data. Here, a page may be a set of memory cells, which indicates a unit on which a program operation of storing data or a read operation of reading stored data is performed. A memory block may be a set of memory cells, which indicates a unit on which an erase operation of erasing data is performed.

One memory block may include a plurality of chunk blocks. One chunk block may include a plurality of chunks. Here, a chunk block may be a unit by which a memory block is divided, and a chunk may be a unit by which a page is divided. A plurality of memory cells included in one chunk block may be coupled to a plurality of page buffers included in one page buffer block. The detailed description thereof will be made later with reference to FIGS. 4 and 5.

The memory controller 200 may control the overall operation of the memory system 10 and the memory device 100. For example, the memory controller 200 may control the memory device 100 so that the memory device 100 performs a program operation of storing data, a read operation of reading stored data, or an erase operation of erasing stored data. In detail, during a program operation, the memory controller 200 may provide a program command, an address, and data to the memory device 100. During a read operation, the memory controller 200 may provide a read command and an address to the memory device 100. During an erase operation, the memory controller 200 may provide an erase command and an address to the memory device 100.

The memory controller 200 may control the memory device 100 so that an operation corresponding to the command is performed on merged pass chunk blocks obtained by merging pass chunk blocks coupled to different page buffer blocks among pass chunk blocks included in memory blocks, each including both a pass chunk block and a bad chunk block, based on chunk block status information. Here, the chunk block status information may be information indicating whether each of chunk blocks is a pass chunk block or a bad chunk block. Here, the bad chunk block may be a chunk block which is physically or logically damaged and from which stored data cannot be normally read. The pass chunk block may be a chunk block from which stored data can be normally read. When any one memory block includes both the pass chunk block and the bad chunk block, the memory block may be referred to as an incomplete pass memory block.

According to an embodiment, there can be provided the memory device 100, which can improve the available capacity of memory blocks, and the memory system 10 having the memory device 100. Hereinafter, embodiments of the present disclosure will be described in detail with reference to the attached drawings.

Figure 2:
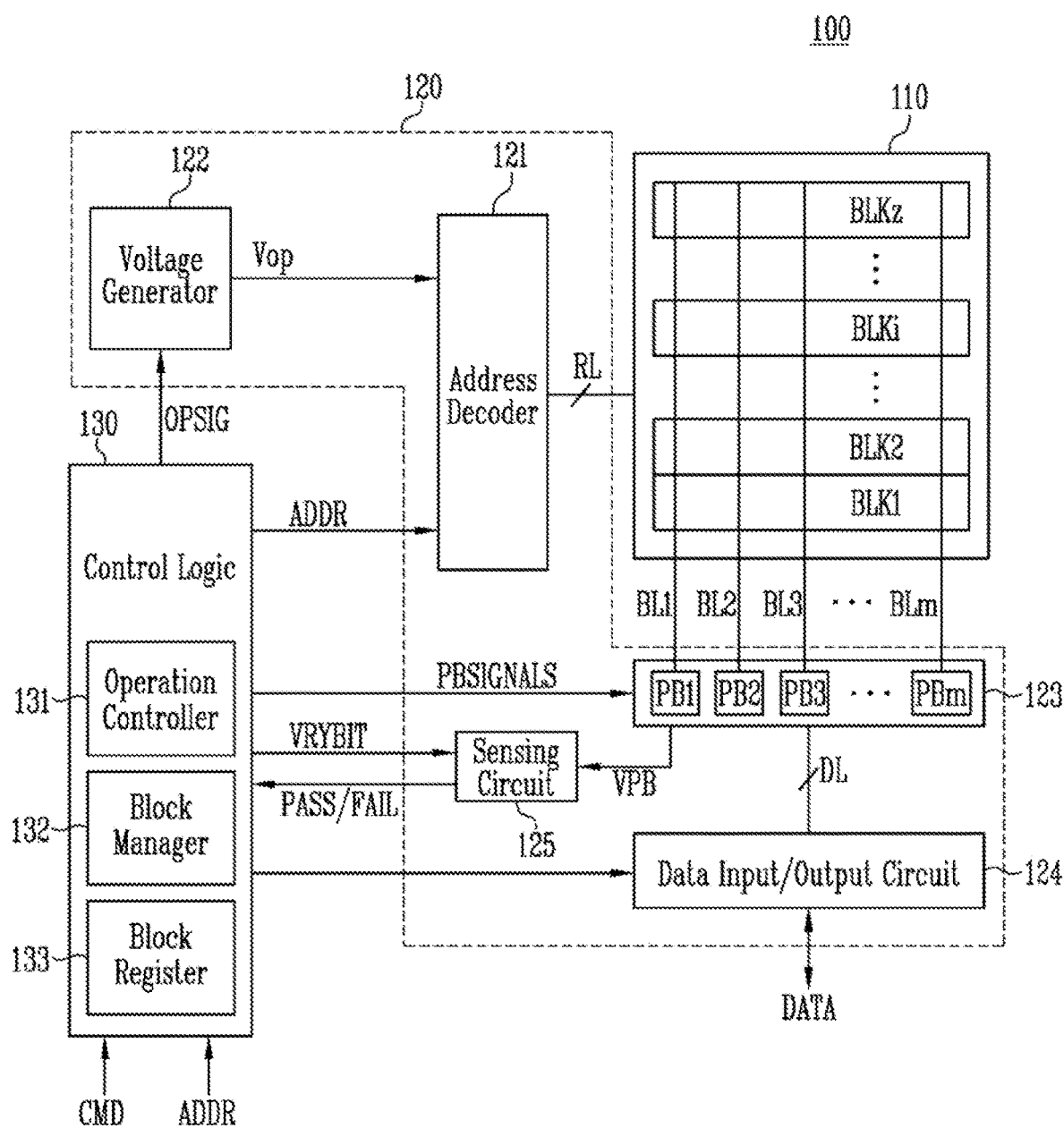
FIG. 2 is a diagram illustrating the structure of a memory device according to an embodiment.

FIG. 2 is a diagram illustrating the structure of a memory device according to an embodiment.

Referring to FIG. 2, the memory device 100 may include a memory cell array 110, a peripheral circuit 120, and a control logic 130.

The memory cell array 110 may include a plurality of memory blocks BLK1 to BLKz. In consideration of the fact that respective memory blocks may be configured in the same structure, any one memory block BLKi among the plurality of memory blocks BLK1 to BLKz will be described below.

The memory block BLKi may include a substrate and a plurality of memory cells. The plurality of memory cells may be arranged or stacked on the substrate. Here, each memory cell may be a semiconductor memory device. In an embodiment, each memory cell may be a nonvolatile memory device. Each memory cell may store data depending on a single-level cell (SLC) scheme capable of storing one data bit, a multi-level cell (MLC) scheme capable of storing two data bits, a triple-level cell (TLC) scheme capable of storing three data bits, and a quad-level cell (QLC) scheme capable of storing four data bits.

The memory block BLKi may be coupled to the address decoder 121 of the peripheral circuit 120 through row lines RL. Here, the row lines RL may include a plurality of word lines. The memory cells included in the memory block BLKi may be coupled to respective page buffers PB1 to PBm of the peripheral circuit 120 through bit lines BL1 to BLm. The structure of the memory block BLKi will be described in detail later with reference to FIG. 3.

The peripheral circuit 120 may drive the memory cell array 110 so that the memory cell array 110 performs a specific operation. For example, the peripheral circuit 120 may drive the memory cell array 110 to perform any one of a program operation, a read operation, and an erase operation.

The peripheral circuit 120 may include the address decoder 121, a voltage generator 122, a read and write circuit 123, a data input/output circuit 124, and a sensing circuit 125.

The address decoder 121 may be coupled to the memory cell array 110 through the row lines RL. The row lines RL may include a drain select line DSL, a plurality of word lines WL1 to WLn, a source select line SSL, and a source line SL. In an embodiment, the address decoder 121 may include components such as a row decoder, a column decoder, and an address buffer.

The address decoder 121 may be operated in response to control of the control logic 130. In an example, the address decoder 121 may receive an address ADDR from the control logic 130. The address decoder 121 may decode a block address included in the received address ADDR. The address decoder 121 may select a memory block corresponding to the block address from among the memory blocks BLK1 to BLKz. The address decoder 121 may decode a page address included in the received address ADDR. The address decoder 121 may select a page (or a word line) corresponding to the page address from among the pages (or word lines) included in the memory block. The address decoder 121 may apply an operating voltage Vop provided from the voltage generator 122 to the selected page (or the selected word line) of the selected memory block.

For example, during a program operation, the address decoder 121 may apply a program voltage to a selected word line and apply a pass voltage having a level lower than that of the program voltage to an unselected word line. During a program verify operation, the address decoder 121 may apply a verify voltage to a selected word line and apply a pass voltage having a level higher than that of the verify voltage to an unselected word line in parallel with the application of the verify voltage. Meanwhile, during a read operation, the address decoder 121 may apply a read voltage to a selected word line and apply a pass voltage having a level higher than that of the read voltage to an unselected word line in parallel with the application of the read voltage. Meanwhile, during an erase operation, the address decoder 121 may apply a first erase voltage to word lines coupled to a selected memory block and apply a second erase voltage having a level higher than that of the first erase voltage to the substrate included in the selected memory block in parallel with the application of the first erase voltage.

The voltage generator 122 may generate a plurality of operating voltages Vop using external power that is supplied to the memory device 100. Here, the external power may be reserve power included in the memory system 10 or power provided from the host system 20. For example, the first and second erase voltages, program voltages, program verify voltages, pass voltages, read voltages, etc. may be generated using the external power supplied to the memory device 100.

The read and write circuit 123 may include a plurality of page buffers PB1 to PBm.

For example, each of the plurality of page buffers PB1 to PBm may be coupled in common to the plurality of memory blocks BLK1 to BLKz through the corresponding bit line among the plurality of bit lines BL1 to BLm. In an embodiment, when a program voltage is applied to a selected word line, the plurality of page buffers PB1 to PBm may transfer signals, corresponding to data DATA received from the data input/output circuit 124 through the data lines DL, to a selected page of a selected memory block through the plurality of bit lines BL1 to BLm. When a program verify voltage is applied to the selected word line, the plurality of page buffers PB1 to PBm may transfer a sensing voltage VPB received from the selected page of the selected memory block through the plurality of bit lines BL1 to BLm to the sensing circuit 125. In an embodiment, when a read voltage is applied to a selected word line, the plurality of page buffers PB1 to PBm may transfer data DATA, corresponding to signals received from a selected page of a selected memory block through the plurality of bit lines BL1 to BLm, to the data input/output circuit 124 through the data line DL.

The data input/output circuit 124 may be coupled to the read and write circuit 123 through the data lines DL. The data input/output circuit 124 may be operated in response to a control signal output from the control logic 130. The data input/output circuit 124 may include a plurality of input/output buffers which receive the input data DATA. During a program operation, the data input/output circuit 124 may receive data DATA from the memory controller 200, and may transfer the received data DATA to the read and write circuit 123. During a read operation, the data input/output circuit 124 may receive the data DATA from the plurality of page buffers PB1 to PBm included in the read and write circuit 123, and may output the received data DATA to the memory controller 200.

When a program verify voltage (or an erase verify voltage) is applied to selected chunks (or selected chunk blocks), the sensing circuit 125 may generate a reference voltage in response to an enable bit signal VRYBIT generated by the control logic 130, and may output a pass signal or a fail signal PASS or FAIL for each of the chunks (or chunk blocks) to the control logic 130 depending on the result of comparing the sensing voltage VPB of each of the chunks (or chunk blocks) received from the read and write circuit 123 with the reference voltage.

The control logic 130 may control the overall operation of the memory device 100. The control logic 130 may control the peripheral circuit 120 so that an operation of storing data in the memory cell array 110, an operation of reading the data stored in the memory cell array 110 or an operation of erasing the data stored in the memory cell array 110 is performed. For this, the control logic 130 may be coupled to the peripheral circuit 120. For example, the control logic 130 may be coupled to the address decoder 121, the voltage generator 122, the read and write circuit 123, the data input/output circuit 124, and the sensing circuit 125.

In an embodiment, the control logic 130 may provide various signals corresponding to a command CMD and an address ADDR, received from the memory controller 200, to the peripheral circuit 120. For example, the control logic 130 may generate an operation signal OPSIG, read and write circuit control signals PBSIGNALS, and the enable bit VRYBIT. The control logic 130 may output the operation signal OPSIG to the voltage generator 122, output the address ADDR to the address decoder 121, output the read and write circuit control signals PBSIGNALS to the read and write circuit 123, and output the enable bit VRYBIT to the sensing circuit 125. In addition, the control logic 130 may verify whether a program operation has passed or failed in response to the pass or fail signal PASS or FAIL received from the sensing circuit 125.

Figure 3:
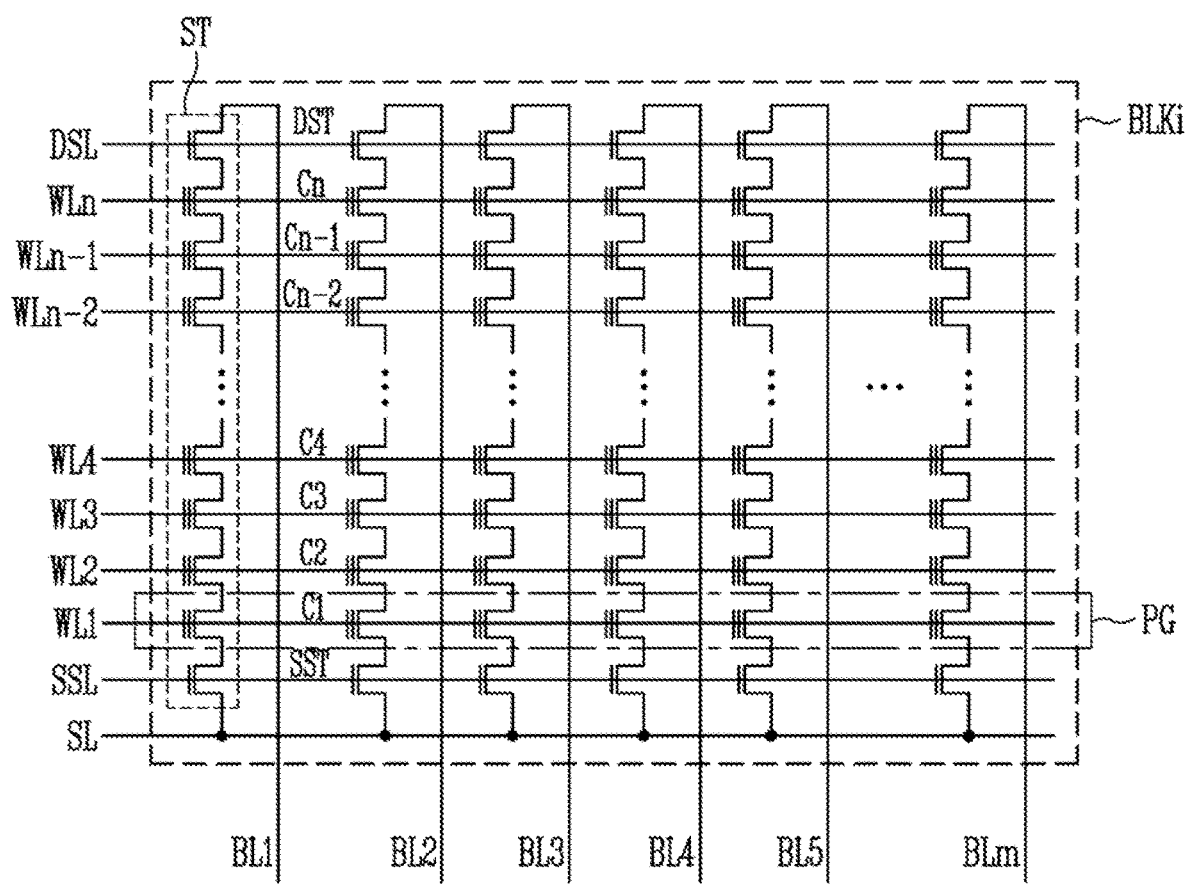
FIG. 3 is a diagram illustrating the structure of a memory block according to an embodiment.

FIG. 3 is a diagram illustrating the structure of a memory block according to an embodiment.

Referring to FIG. 3, a memory block BLKi may include a plurality of strings. Since the plurality of strings may be equally configured, a string ST coupled to a first bit line BL1 will be described in detail by way of example. A first end of any one string ST may be coupled to one of bit lines BL1 to BLm. A second end of any one string ST may be coupled to a source line SL. One source line SL may be coupled in common to the plurality of strings, and one bit line may be coupled to one string.

The string ST may include a source select transistor SST, a plurality of memory cells C1 to Cn, and a drain select transistor DST which are coupled in series to each other between the source line SL and the first bit line BL1. In an embodiment, the string ST may include at least one source select transistor SST and at least one drain select transistor DST, and may also include more memory cells than the memory cells C1 to Cn illustrated in the drawing.

Gates of the source select transistors SST may be coupled to a source select line SSL, and gates of the drain select transistors DST may be coupled to a drain select line DSL. A source of each source select transistor SST may be coupled to the source line SSL, and a drain of each drain select transistor DST may be coupled to the respective bit line.

Gates of the plurality of memory cells C1 to Cn may be coupled to a plurality of word lines WL1 to WLn, respectively. The plurality of memory cells C1 to Cn may be coupled in series to the source select transistor SST and the drain select transistor DST therebetween.

The memory block BLKi may include a plurality of pages. One page PG may be defined as a group of memory cells coupled in common to the same word line. The page PG may store page data. The page data may include data bits corresponding to the number of memory cells C1 to Cn included in the page PG. In an example, when each of the memory cells C1 to Cn included in the page PG is capable of storing 1-bit data, the page PG may store one piece of page data. In an example, when each of the memory cells C1 to Cn included in the page PG is capable of storing 2-bit data, the page PG may store two pieces of page data.

Meanwhile, in an embodiment, the page PG may be a set of memory cells corresponding to a unit on which a program operation or a read operation is performed. The memory block BLKi may be a set of memory cells corresponding to a unit on which an erase operation is performed.

The program operation may be performed using an incremental step pulse programming (ISPP) method. The ISPP method may be a method of repeatedly performing a program loop in which a program voltage apply operation and a verify voltage apply operation are sequentially performed.

For example, the program voltage apply operation may be an operation in which the memory device 100 applies a program voltage having a preset level to a page selected by an address through a word line coupled to the selected page to store page data in the selected page. The verify voltage apply operation may be an operation in which the memory device 100 applies a verify voltage having a preset level to the selected page through the word line coupled to the selected page and determines whether the corresponding program loop has passed or failed by comparing data output from the selected page with page data. Here, the memory device 100 may terminate the program operation when the corresponding program loop has passed. Unlike this, when the corresponding program loop has failed, the memory device 100 may proceed to a next program loop. The levels of a program voltage and a program verify voltage to be applied in the next program loop may be set to levels different from those of the program voltage and the program verify voltage applied in the previous program loop. When the number of times that the program loop is performed is greater than the reference number of times, the memory device 100 may terminate the program operation performed on the selected page. In this case, the memory device 100 may store the selected page as a bad area.

During a read operation, in order to read data stored in a page selected by the address, the memory device 100 may apply a read voltage having a preset level to the selected page through a word line coupled to the selected page, and may apply a pass voltage to the remaining word lines in parallel with the application of the read voltage. Here, the read voltage may be a voltage having a preset level depending on a scheme, such as a single-level cell, a multi-level cell, a triple-level cell, or a quad-level cell. The pass voltage may be a high voltage having a level higher than a level required in order to form channels in the memory cells included in unselected pages.

During an erase operation, in order to erase data stored in a memory block selected by an address, the memory device 100 may apply a first erase voltage to the selected memory block through word lines coupled to the selected memory block. Here, the first erase voltage may be, for example, a ground voltage or a low-voltage having a level similar to that of the ground voltage. In parallel with the application of the first erase voltage, the memory device 100 may apply a second erase voltage to a substrate included in the selected memory block. The second erase voltage may be a high voltage having a level higher than that of the first erase voltage.

Figure 4:
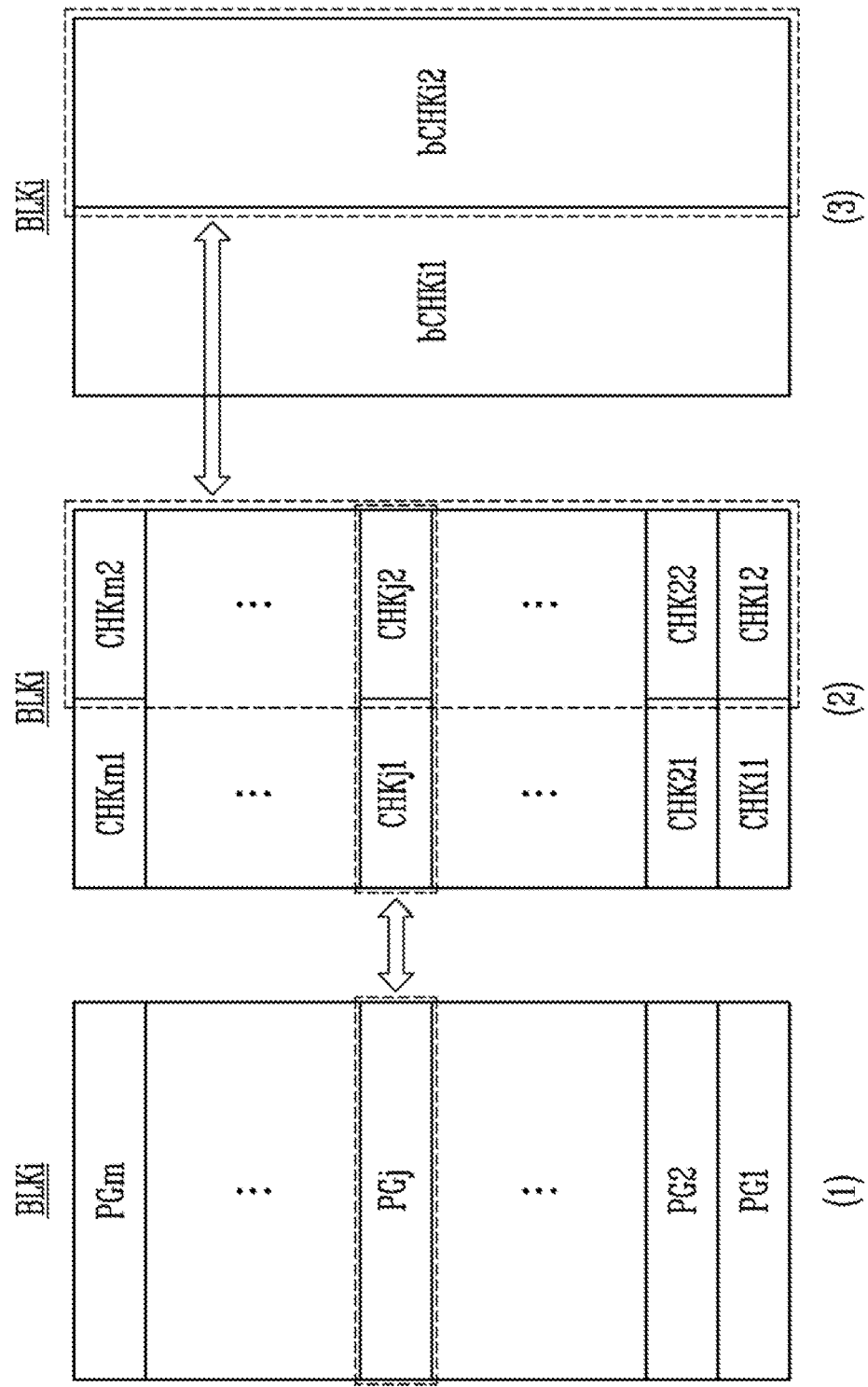
FIG. 4 is a diagram illustrating a relationship between a memory block and a chunk block according to an embodiment.

FIG. 4 is a diagram illustrating a relationship between a memory block and a chunk block according to an embodiment.

Any one memory block BLKi, among the plurality of memory blocks BLK1 to BLKz illustrated in FIG. 2, will be described below with reference to FIG. 4.

Referring to (1) in FIG. 4, the memory block BLKi may include a plurality of pages PG1 to PGm coupled to different word lines. A page PGj may include a plurality of memory cells coupled in common to one word line.

Referring to (1) and (2) in FIG. 4, the memory block BLKi may include a plurality of chunks CHK11 to CHKm1 and CHK12 to CHKm2. The page PGj may include chunks CHKj1 and CHKj2 coupled to the corresponding word line, among the plurality of chunks CHK11 to CHKm1 and CHK12 to CHKm2. For example, each of the plurality of chunks CHKj1 and CHKj2 may include some of the plurality of memory cells included in the page PGj. The plurality of chunks CHKj1 and CHKj2 may be coupled to different page buffer blocks (or different bit lines).

Referring to (2) and (3) in FIG. 4, the memory block BLKi may include a plurality of chunk blocks bCHKi1 and bCHKi2. Each of the plurality of chunk blocks bCHKi1 and bCHKi2 may include chunks coupled to the same page buffer block. For example, the first chunk block bCHKi1 may include a plurality of first chunks CHK11 to CHKm1 coupled in common to a first page buffer block, and the second chunk block bCHKi2 may include a plurality of second chunks CHK12 to CHKm2 coupled in common to a second page buffer block.

That is, each of the pages PG1 to PGm may be a set of memory cells obtained by grouping memory cells included in the memory block BLKi depending on the word line, and each of the chunk blocks bCHKi1 and bCHKi2 may be a set of memory cells obtained by grouping the memory cells included in the memory block BLKi depending on the page buffer block.

Meanwhile, the number of chunk blocks bCHKi1 and bCHKi2 and the number of chunks CHK11 to CHKm1 and CHK12 to CHKm2, which are illustrated in (2) and (3) of FIG. 4, are only examples, and the numbers thereof may be modified and implemented in various forms. Hereinafter, for convenience of description, a description will be made on the assumption that the number of chunk blocks bCHKi1 and bCHKi2 included in one memory block BLKi is 2.

Figure 5:
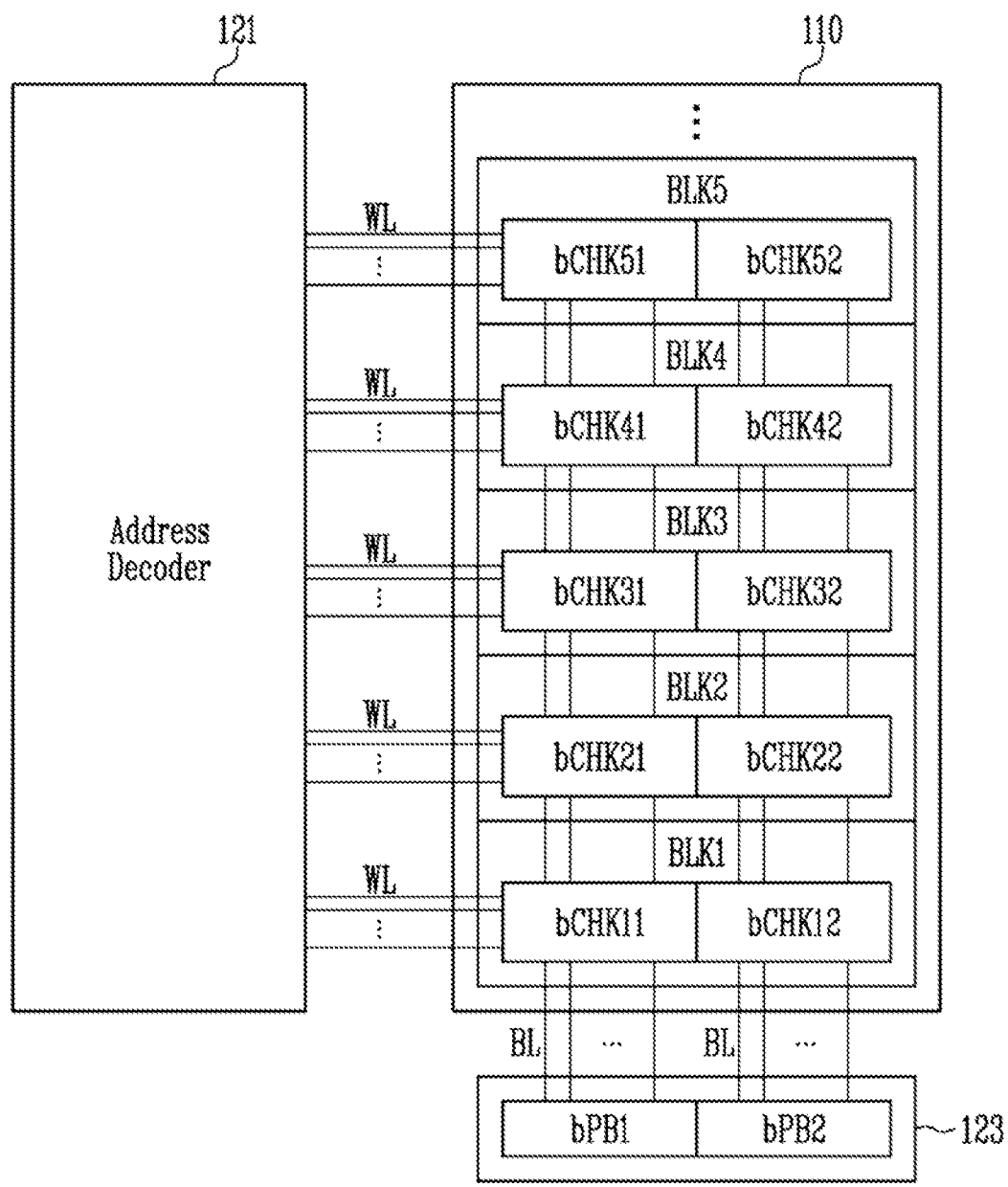
FIG. 5 is a diagram illustrating the structure of a chunk block according to an embodiment.

FIG. 5 is a diagram illustrating the structure of a chunk block according to an embodiment.

Referring to FIG. 5, a memory cell array 110 may include a plurality of memory blocks BLK1 to BLK5.

Each of the plurality of memory blocks BLK1 to BLK5 may include a first chunk block bCHK11, bCHK21, bCHK31, bCHK41, or bCHK51 coupled to a first page buffer block bPB1 through bit lines BL and a second chunk block bCHK12, bCHK22, bCHK32, bCHK42, or bCHK52 coupled to a second page buffer block bPB2 through the bit lines BL. Each of the first page buffer block bPB1 and the second page buffer block bPB2 may include a plurality of page buffers. The page buffers included in the first page buffer block bPB1 may be respectively coupled to memory cells included in each of the first chunk blocks bCHK11, bCHK21, bCHK31, bCHK41, and bCHK51. The page buffers included in the second page buffer block bPB2 may be respectively coupled to memory cells included in each of the second chunk blocks bCHK12, bCHK22, bCHK32, bCHK42, and bCHK52.

Each of the plurality of memory blocks BLK1 to BLK5 may be coupled to the address decoder 121 through word lines WL. The address decoder 121 may apply an operating voltage corresponding to a command to a memory block selected by an address through the word lines.

Referring back to FIG. 2, the control logic 130 may include an operation controller 131, a block manager 132, and a block register 133.

When a command CMD and an address ADDR are received from the memory controller 200, the operation controller 131 may control the peripheral circuit 120 so that an operation instructed by the command CMD is performed on a memory block selected by the address ADDR. The command CMD may be one of a program command instructing a program operation, a read command instructing a read operation, and an erase command instructing an erase operation.

The block manager 132 may manage the plurality of memory blocks BLK1 to BLKz included in the memory cell array 110. In an embodiment, the block manager 132 may acquire information about each memory block, and may store the acquired information in the block register 133. For example, the block manager 132 may store chunk block status information indicating the bad or pass status of a chunk block or chunk status information indicating the bad or pass status of a chunk in the block register 133 depending on the result of performing a program operation on each memory block.

The block register 133 may store information about each memory block. The block register 133 may include at least one of the identifier of the plurality of memory blocks BLK1 to BLKz, the identifier of chunk blocks included in each memory block, the identifier of chunks included in each chunk block, chunk block status information indicating whether each chunk block is a bad chunk block or a pass chunk block, and chunk status information indicating whether each chunk is a pass chunk in which recoverable data is stored or a bad chunk in which unrecoverable data is stored. Here, the identifiers may indicate information for identifying memory blocks, chunk blocks or chunks.

In an embodiment, the block manager 132 may assign an address indicating one memory block to merged pass chunk blocks based on the chunk block status information stored in the block register 133, and may store the assigned address in the block register 133. For this operation, the block manager 132 may periodically determine, based on the chunk block status information stored in the block register 133, whether pass chunk blocks coupled to different page buffer blocks are present among memory blocks including a bad chunk block. Meanwhile, in accordance with an embodiment of the present disclosure, the operation of the block manager 132 may be modified to be performed by the memory controller 200.

In an embodiment, the operation controller 131 may control the address decoder 121 so that a program loop operation of sequentially applying a program voltage and a program verify voltage to chunks coupled to a selected word line among the chunks included in the chunk blocks is repeatedly performed. After the program verify voltage is applied to the chunks coupled to the selected word line, the operation controller 131 may determine whether the corresponding program loop operation has passed or failed for each chunk based on the pass or fail signal PASS or FAIL received from the sensing circuit 125. When the corresponding program loop operation fails, the operation controller 131 may control the address decoder 121 so that a next program loop operation is repeatedly performed before the number of times that the program loop operation is performed is greater than the reference number of times.

In an embodiment, the block manager 132 may determine a chunk, which outputs data that matches data corresponding to a program voltage while the number of times that the program loop operation is performed is within the reference number of times, among pieces of data output from chunks to which the program verify voltage is applied, to be a pass chunk. Further, the block manager 132 may determine that a chunk from which data non-matching the data corresponding to the program voltage is output while the number of times that the program loop operation is performed is within the reference number of times is a bad chunk. Further, the block manager 132 may store chunk status information indicating whether each chunk is a pass chunk or a bad chunk in the block register 133. Meanwhile, in other embodiments, the operation controller 131 may control the address decoder 121 so that the program voltage and the program verify voltage are sequentially applied to the selected chunk, and the operation controller 131 may transmit a pass or fail signal PASS or FAIL received through the sensing circuit 125 to the memory controller 200. In this case, the memory controller 200 may determine each chunk to be one of a bad chunk and a pass chunk based on the received pass or fail signal PASS or FAIL.

In an embodiment, the block manager 132 may identify the number of bad chunks included in one chunk block based on the chunk status information. When the number of bad chunks included in one chunk block is equal to or greater than the reference number of bad chunks, the block manager 132 may determine the corresponding chunk block to be a bad chunk block. When the number of bad chunks included in one chunk block is less than the reference number of bad chunks, the block manager 132 may determine the corresponding chunk block to be a pass chunk block. Here, the reference number of bad chunks may be a preset value, and may have any of various values. The block manager 132 may store chunk block status information indicating whether each chunk block is a bad chunk block or a pass chunk block in the block register 133.

In an embodiment, the block register 133 may store an address corresponding to merged pass chunk blocks, obtained by merging pass chunk blocks coupled to different page buffer blocks, among pass chunk blocks included in memory blocks, each of which include both a pass chunk block and a bad chunk block.

In an embodiment, the merged pass chunk blocks may include a first pass chunk block coupled to a first page buffer block, which is included in the page buffer blocks, and a second pass chunk block coupled to a second page buffer block.

For example, it is assumed that, with reference to FIG. 5, chunk block status information stored in the block register 133 indicates that, among the plurality of memory blocks BLK1 to BLKz, the first memory block BLK1 includes a first pass chunk block coupled to the first page buffer block bPB1 and a second bad chunk block coupled to the second page buffer block bPB2, and the second memory block BLK2 includes a first bad chunk block coupled to the first page buffer block bPB1 and a second pass chunk block coupled to the second page buffer block bPB2. In this case, the block manager 132 may merge the first pass chunk block included in the first memory block BLK1 with the second pass chunk block included in the second memory block BLK2 based on the chunk block status information stored in the block register 133, and may store an address corresponding to the merged pass chunk blocks in the block register 133. Here, the address may be a block address indicating one memory block.

In an embodiment, the operation controller 131 may control the address decoder 121 so that an operating voltage corresponding to the command CMD is applied to the merged pass chunk blocks. Here, the command CMD may be any one of an erase command, a program command, and a read command.

For example, the merged pass chunk blocks may include a first pass chunk block included in any one of the plurality of memory blocks BLK1 to BLKz and a second pass chunk block included in another memory block. Here, the first pass chunk block and the second pass chunk block may be blocks coupled to different page buffer blocks.

As described above, in accordance with an embodiment of the present disclosure, even if a portion of a certain memory block is a bad area, the corresponding memory block is not processed as a bad block, but pass areas respectively included in memory blocks having partial bad areas may be merged to function as one memory block. Accordingly, in an embodiment, the available capacity of memory blocks may be improved without requiring separate reserved memory blocks.

Figure 6:
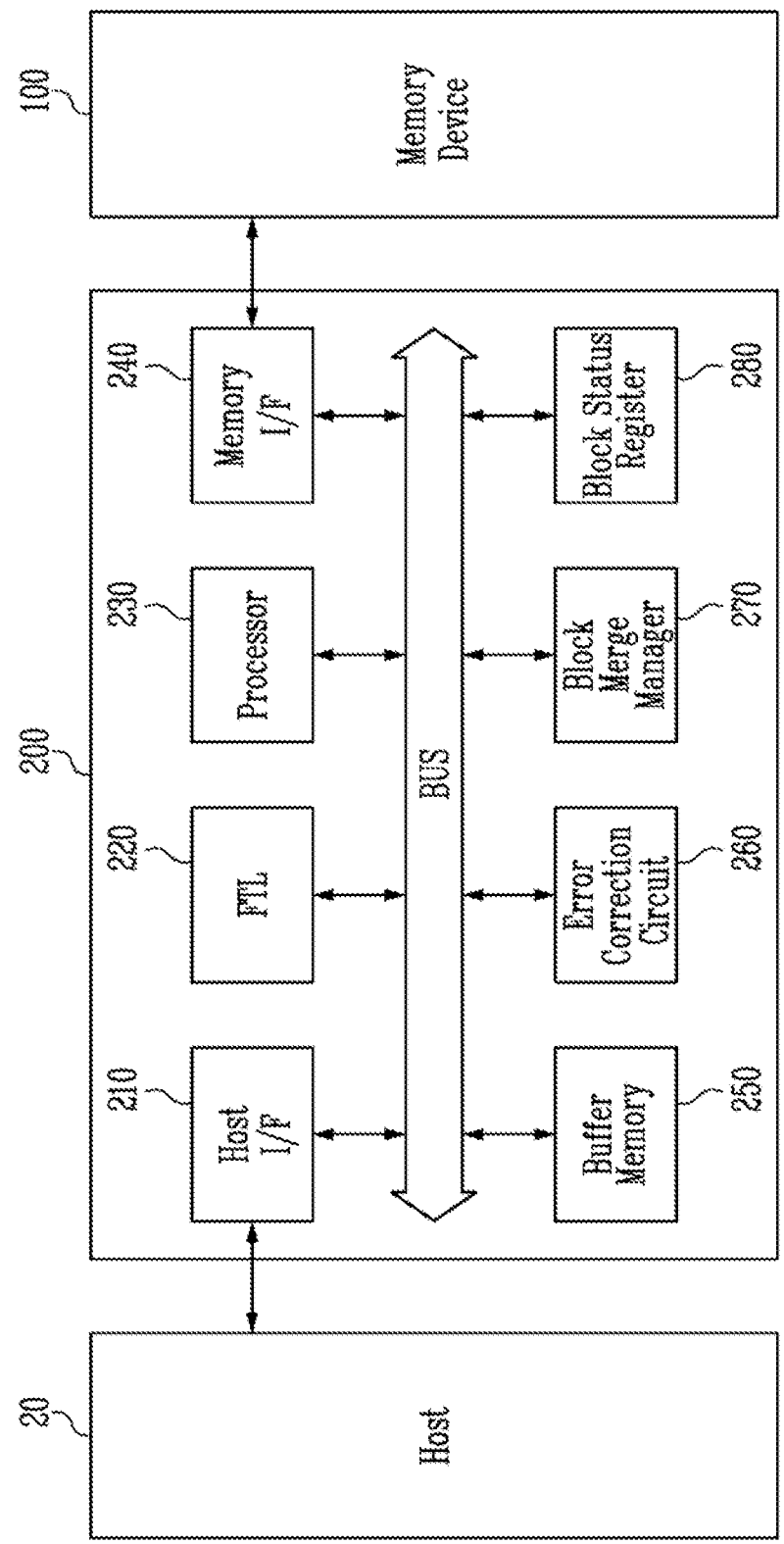
FIG. 6 is a diagram illustrating the structure of a memory controller according to an embodiment.

FIG. 6 is a diagram illustrating the structure of a memory controller according to an embodiment.

Referring to FIG. 6, the memory controller 200 may include a host interface (I/F) 210, a flash translation layer (FTL) 220, a processor 230, a memory interface (I/F) 240, a buffer memory 250, an error correction circuit 260, a block merge manager 270, and a block status register 280.

The host interface 210 may communicate with a host system 20 complying with various interface protocols. For example, the host interface 210 may perform communication in conformity with any of various communication protocols, such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), firewire, universal flash storage (UFS) interfaces, and universal asynchronous receiver/transmitter (UART).

The host interface 210 may receive various requests from the host system 20. For example, the requests may include a write request to instruct storage of data, a read request to instruct output of stored data, and an erase request to erase stored data. The host interface 210 may transfer the received requests to the processor 230.

The host interface 210 may receive data and a logical address from the host system 20. Also, the host interface 210 may transfer the received data to the buffer memory 250. The host interface 210 may transfer the received logical address to the flash translation layer 220 or the processor 230.

The flash translation layer 220 may store an address mapping table indicating mapping relationships between logical addresses and physical addresses. When a logical address is received from the host system 20, the flash translation layer 220 may transfer the physical address of the memory device 100 corresponding to the received logical address to the processor 230 based on the address mapping table.

The processor 230 may control the overall operation of the memory controller 200. When power is applied to the memory system 10, the processor 230 may execute an instruction. The instruction may be related to, for example, firmware (FW) or the like. The firmware may include a host interface layer (HIL) and a flash interface layer (FIL). The host interface layer may control communication between the host system 20 and the host interface 210. That is, the operation of the host interface 210 may be controlled by the host interface layer (HIL). The flash interface layer may control communication between the memory interface 240 and the memory device 100. Meanwhile, although the processor 230 and the flash translation layer 220 are illustrated as being separate components in FIG. 6, this illustration is only an example, and a configuration in which the operation of the flash translation layer 220 is performed by the processor 230 may also be implemented.

The memory interface 240 may exchange commands, addresses, and data between the memory controller 200 and the memory device 100 through a channel. For example, the memory interface 240 may transmit commands and addresses output from the processor 230 and data output from the buffer memory 250 to the memory device 100 through the channel. The memory interface 240 may transmit data received from the memory device 100 to the buffer memory 250 through the channel.

For example, the memory interface 240 may transmit a program command, an address, and data, stored in the buffer memory 250, to the memory device 100. In this case, the memory device 100 may store data in a page of a memory block corresponding to the address. In an example, the memory interface 240 may transmit a read command and an address to the memory device 100. In this case, the memory interface 240 may receive data, stored in a page of a memory block corresponding to the address, from the memory device 100. In an example, the memory interface 240 may transmit an erase command and an address to the memory device 100. In this case, the memory device 100 may erase data stored in a memory block corresponding to the address.

The buffer memory 250 may temporarily store data received from the host system 20. Here, the data received from the host system 20 may be data to be stored in the memory device 100 in response to the program command. For example, the buffer memory 250 may store data received from the host system 20. The buffer memory 250 may delete the stored data after the data is stored in the memory device 100.

The buffer memory 250 may temporarily store data received from the memory device 100. The data received from the memory device 100 may be data that is stored in the memory device 100 and is to be provided to the host system 20 in response to a read command. For example, the buffer memory 250 may store data received from the memory device 100. The buffer memory 250 may delete the stored data after the data is transmitted to the host system 20.

For this operation, the buffer memory 250 may be implemented as a static random access memory (Static RAM: SRAM) in which stored data can be continuously retained as long as power is supplied, or as a dynamic RAM (DRAM) in which stored data can be retained only when a refresh operation is performed at intervals of a predetermined time. In an embodiment, a portion of the buffer memory 250 may be configured as a working memory of the memory controller 200, and may also be used as a cache memory. In an embodiment, in a portion of the buffer memory 250, firmware may be stored. The firmware stored in the buffer memory 250 may be run by the processor 230. However, this is only an embodiment, and the memory controller 200 may further include at least one of a working memory independent of the buffer memory 250, a cache memory, and a separate memory for storing firmware. The word "predetermined" as used herein with respect to a parameter, such as a predetermined time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The error correction circuit 260 may perform an encoding operation of generating the parity bit of data to be transmitted to the memory device 100 using an error correction code. The error correction circuit 260 may perform the encoding operation on each of pieces of chunk data into which the data is divided. Here, the data may have a size corresponding to a page, and chunk data may have a size corresponding to a chunk. Here, a parity bit may be a code used to detect or correct error bits in the data. For example, the parity bit may be inserted into the location corresponding to a start portion or an end portion of data bits in actual data. In an example, the parity bit may be inserted into locations corresponding to a power of 2, such as 1, 2, 4, 8, 16, . . . , and data bits in the actual data may be arranged at the remaining locations.

The error correction circuit 260 may perform a decoding operation of detecting and correcting error bits included in the data read from the memory device 100 based on the parity bit included in the read data. The error correction circuit 260 may perform an encoding or decoding operation using a low density parity check (LDPC) code, a Bose, Chaudhri, Hocquenghem (BCH) code, a turbo code, a Reed-Solomon code, a convolution code, a recursive systematic code (RSC), or coded modulation such as trellis-coded modulation (TCM), block coded modulation (BCM), or hamming code. Here, the decoding operation may be referred to as an "error correction operation."

The error correction circuit 260 may detect error bits included in data using the parity bit included in the data. For example, the error correction circuit 260 may detect error bits included in data using any of various schemes, such as a parity check, a block sum check, and a cyclic redundancy check (CRC).

The error correction circuit 260 may correct error bits in data when the number of error bits in the data is less than the reference number of error bits. The error correction circuit 260 cannot correct error bits in data when the number of error bits in the data is equal to or greater than the reference number of error bits. Here, the reference number of error bits may indicate ability to correct error bits.

The block merge manager 270 may manage a plurality of memory blocks BLK1 to BLKz included in the memory device 100. In an embodiment, the block merge manager 270 may acquire information about each memory block, and may store the acquired information in the block status register 280. For example, the block merge manager 270 may acquire operation results of performing a program operation or a read operation on each memory block, and may store chunk block status information or chunk status information in the block status register 280 based on the operation results. Here, the chunk block status information may be information indicating the bad or pass status of each chunk block, and the chunk status information may be information indicating the bad or pass status of each chunk.

The block status register 280 may store at least one of the identifier of chunk blocks included in each memory block, chunk block status information, the identifier of chunks included in each chunk block, and chunk status information indicating whether each chunk is a pass chunk in which recoverable data is stored or a bad chunk in which unrecoverable data is stored.

In an embodiment, the processor 230 may control the memory device 100 so that an operation corresponding to the command is performed on merged pass chunk blocks obtained by merging pass chunk blocks coupled to different page buffer blocks among pass chunk blocks included in memory blocks, each including both a pass chunk block and a bad chunk block, based on chunk block status information.

Here, the chunk block status information may be stored in the block status register 280. A block address indicating one memory block may be assigned to the merged pass chunk blocks. The block address may be stored in the block status register 280.

In an embodiment, the block merge manager 270 may assign a block address indicating one memory block to the merged pass chunk blocks based on the chunk block status information stored in the block status register 280, and may store the assigned block address in the block status register 280.

Further, when a command and a logical address corresponding to a block address are received from the host system 20, the processor 230 may control the memory device 100 so that an operation corresponding to the command is performed on the merged pass chunk blocks. Here, the command may be one of an erase command, a program command, and a read command.

In an embodiment, the processor 230 may control the memory device 100 so that a read operation of reading pieces of data stored in chunks coupled to a selected word line, among chunks included in the memory block, is performed.

In this case, when pieces of data acquired through the read operation are received, the error correction circuit 260 may perform an error correction operation of correcting error bits included in each of the pieces of data. Here, the pieces of data may be pieces of chunk data. Here, the error correction circuit 260 may determine that the error correction operation has failed when the number of error bits included in chunk data is equal to or greater than the reference number of error bits. The error correction circuit 260 may determine that the error correction operation has passed when the number of error bits included in the chunk data is less than the reference number of error bits. Further, the block merge manager 270 may determine that a chunk in which data having failed in the error correction operation, among the pieces of data, is stored is a bad chunk, and that a chunk in which data having passed the error correction operation, among the pieces of data, is stored is a pass chunk.

In an embodiment, the processor 230 may control the memory device 100 so that a program operation of storing pieces of data in chunks coupled to a selected word line, among chunks included in chunk blocks, is performed. Also, the processor 230 may receive a signal indicating whether the result of performing the program operation is a pass or a failure from the memory device 100. In this case, the block merge manager 270 may determine that a chunk having failed in the program operation, among the chunks, is a bad chunk and that a chunk having passed the program operation is a pass chunk.

In an embodiment, when the number of bad chunks included in one chunk block is equal to or greater than the reference number of bad chunks, the block merge manager 270 may determine the corresponding chunk block to be a bad chunk block. When the number of bad chunks included in one chunk block is less than the reference number of bad chunks, the block merge manager 270 may determine the corresponding chunk block to be a pass chunk block.

Meanwhile, a bad area of the memory device 100 according to an embodiment of the present disclosure may occur in the process for manufacturing the memory device 100, as in the case of initial defects. In this case, an external device coupled to the memory device 100 may detect bad chunk blocks in each of the plurality of memory blocks included in the memory device 100. The external device may merge pass chunk blocks included in respective memory blocks having bad chunk blocks into one memory block, and may assign a block address indicating the one memory block to the pass chunk blocks merged into the one memory block. The block address assigned by the external device may be stored in the memory device 100. In an example, the block address assigned by the external device may be stored in the memory controller 200. Here, the external device may be a test device for detecting defects in the memory device 100. However, this is only an embodiment, and the external device may be the host system 20 or the memory controller 200.

In other embodiments, the bad area may occur due to degradation of the memory device 100 caused by the lapse of time or repeated operations. In this case, the operation of assigning a block address to the above-described pass chunk blocks may be performed by the memory device 100 or the memory controller 200.

Figure 7:
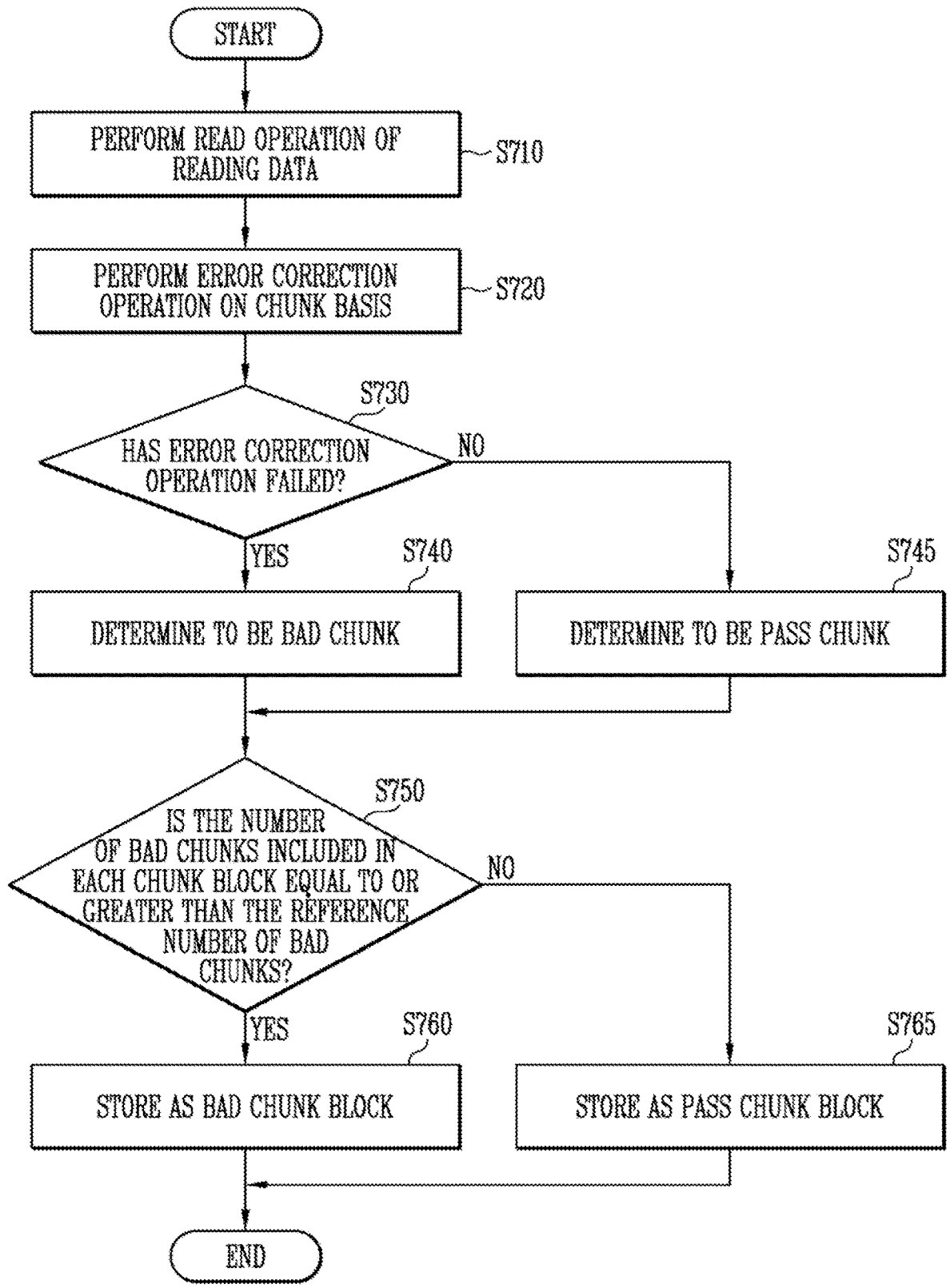
FIG. 7 is a flowchart illustrating a method of storing information related to a chunk block according to an embodiment.

FIG. 7 is a flowchart illustrating a method of storing information related to a chunk block according to an embodiment.

Referring to FIG. 7, the processor 230 of the memory controller 200 according to an embodiment of the present disclosure may control the memory device 100 so that a read operation of reading data stored in each of a plurality of memory blocks BLK1 to BLKz included in the memory device 100 is performed at step S710. In this case, pieces of data may be sequentially read from a plurality of pages included in the memory block. Data read from one page may include pieces of chunk data read from chunks corresponding to the corresponding page.

Further, the error correction circuit 260 of the memory controller 200 may perform an error correction operation on chunk data that is read on a chunk basis at step S720. For example, the error correction circuit 260 may detect error bits included in the chunk data using a parity bit included in the chunk data.

The error correction circuit 260 of the memory controller 200 may determine that the error correction operation has failed when the number of error bits included in the chunk data is equal to or greater than the reference number of error bits (in the case of Yes at step S730). In this case, the block merge manager 270 of the memory controller 200 may determine a chunk outputting chunk data having a number of error bits equal to or greater than the reference number of error bits as a bad chunk at step S740. Furthermore, the block merge manager 270 may store chunk status information indicating that the chunk is the bad chunk in the block status register 280.

The error correction circuit 260 of the memory controller 200 may determine that the error correction operation has passed when the number of error bits included in the chunk data is less than the reference number of error bits (in the case of No at step S730). In this case, the block merge manager 270 of the memory controller 200 may determine a chunk outputting chunk data having a number of error bits less than the reference number of error bits as a pass chunk at step S745. Furthermore, the block merge manager 270 may store chunk status information indicating that the chunk is the pass chunk in the block status register 280.

When the number of bad chunks included in each chunk block is equal to or greater than the reference number of bad chunks (in the case of Yes at step S750), the block merge manager 270 may determine the chunk block including a number of bad chunks equal to or greater than the reference number of bad chunks as a bad chunk block, and may store chunk block status information indicating that the chunk block is a bad chunk block in the block status register 280 at step S760.

When the number of bad chunks included in each chunk block is less than the reference number of bad chunks (in the case of No at step S750), the block merge manager 270 may determine the chunk block including a number of bad chunks less than the reference number of bad chunks as a pass chunk block, and may store chunk block status information indicating that the corresponding chunk block is a pass chunk block in the block status register 280 at step S765.

Figure 8:
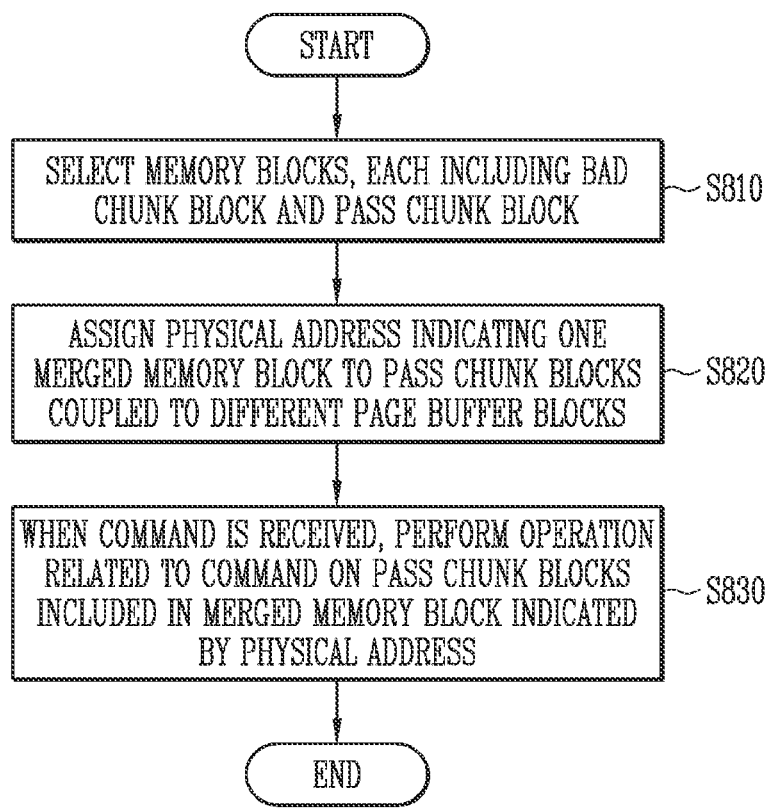
FIG. 8 is a flowchart illustrating a method of performing an operation on a chunk block according to an embodiment.

FIG. 8 is a flowchart illustrating a method of performing an operation on a chunk block according to an embodiment.

Referring to FIG. 8, the processor 230 may select memory blocks, each including both a pass chunk block and a bad chunk block, from among a plurality of memory blocks based on chunk block status information at step S810. Here, the chunk block status information may be stored in the block status register 280.

The processor 230 may assign a physical address indicating one merged memory block to pass chunk blocks coupled to different page buffer blocks among pass chunk blocks included in the selected memory blocks at step S820. Here, the physical address may be a block address indicating one memory block.

When a command and a logical address are received from the host system 20, the processor 230 may control the memory device 100 so that an operation related to the command is performed on a memory block indicated by a physical address corresponding to the logical address. Here, when the physical address corresponding to the logical address indicates a merged memory block, the processor 230 may control the memory device 100 so that the operation related to the command is performed on the pass chunk blocks included in the merged memory block at step S830.

Figure 9:
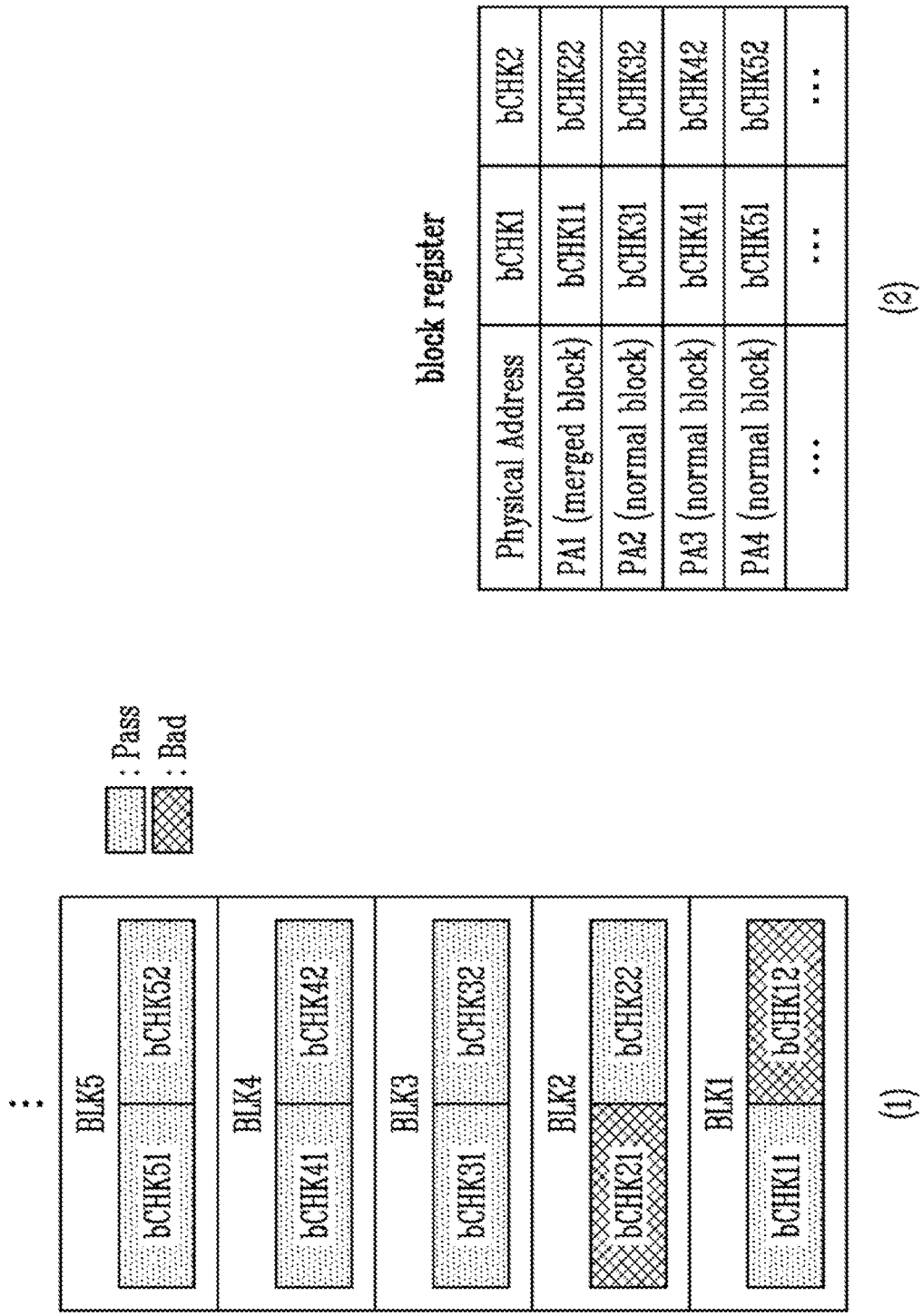
FIG. 9 is a diagram illustrating a method of managing chunk blocks according to an embodiment.

FIG. 9 is a diagram illustrating a method of managing chunk blocks according to an embodiment.

Referring to (1) in FIG. 9, a memory cell array 110 according to an embodiment may include a plurality of memory blocks BLK1 to BLK5.

For example, the first memory block BLK1 may include a first pass chunk block bCHK11 and a first bad chunk block bCHK12, and the second memory block BLK2 may include a second bad chunk block bCHK21 and a second pass chunk block bCHK22. The third to fifth memory blocks BLK3 to BLK5 may include pass chunk blocks bCHK31 and bCHK32, bCHK41 and bCHK42, and bCHK51 and bCHK52, respectively.

Here, the first pass chunk block bCHK11 and the second bad chunk block bCHK21 may be disposed in a first column, and the first bad chunk block bCHK12 and the second pass chunk block bCHK22 may be disposed in a second column. Here, the same column may indicate that chunk blocks are coupled to the same page buffer block. Different columns may indicate that chunk blocks are coupled to different page buffer blocks.

In this case, information about a table format shown in (2) of FIG. 9 may be stored in the block register 133 or the block status register 280. For example, the block register 133 or the block status register 280 may store at least one of the identifier of each chunk block, the column of the chunk block, chunk block status information indicating whether the chunk block is a bad chunk block or a pass chunk block, and a physical address. Here, the column may indicate information about the page buffer block to which the corresponding chunk block is coupled. Meanwhile, this is only an embodiment, and various types of information may be stored in the block register 133 or the block status register 280.

Here, the block manager 132 or the block merge manager 270 may select the first memory block BLK1 and the second memory block BLK2, each including both a pass chunk block and a bad chunk block, from among the plurality of memory blocks BLK1 to BLK5 based on the information stored in the block register 133 or the block status register 280. Further, the block manager 132 or the block merge manager 270 may merge the first pass chunk block bCHK11 and the second pass chunk block bCHK22 disposed in different columns, among the chunk blocks included in the first memory block BLK1 and the second memory block BLK2, into one memory block. The block manager 132 or the block merge manager 270 may assign a block address indicating one memory block to the merged memory block including the first pass chunk block bCHK11 and the second pass chunk block bCHK22, and may store the block address corresponding to the first pass chunk block bCHK11 and the second pass chunk block bCHK22 in the block register 133 or the block status register 280.

Figure 10:
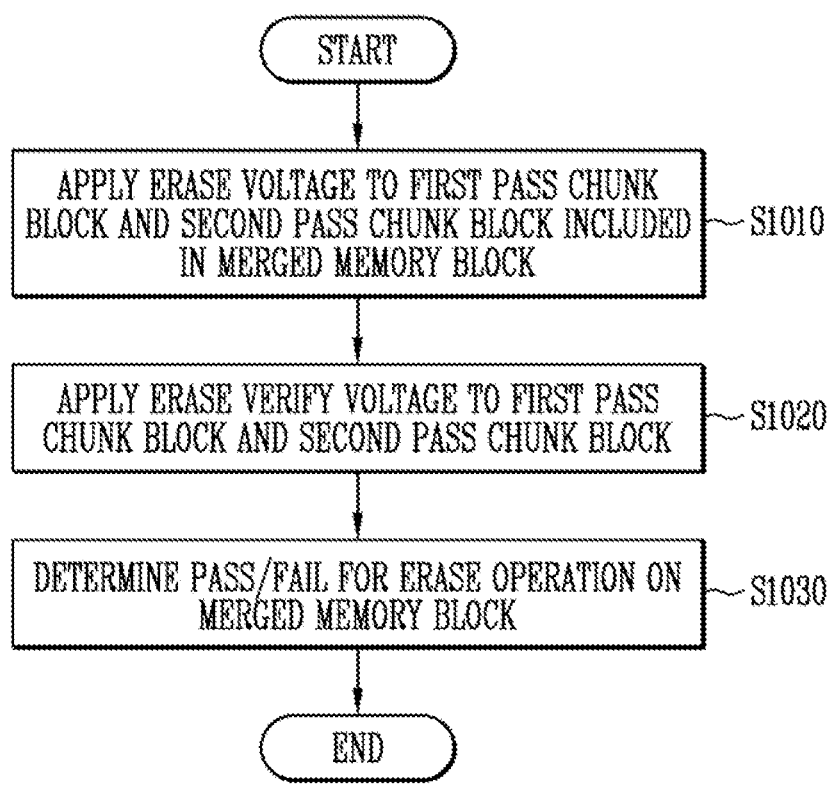
FIG. 10 is a flowchart illustrating a method of performing an erase operation on a merged memory block according to an embodiment.

FIG. 10 is a flowchart illustrating a method of performing an erase operation on a merged memory block according to an embodiment.

Referring to FIG. 10, when an erase command is received, the memory device 100 may apply an erase voltage to a first pass chunk block and a second pass chunk block that are included in a merged memory block at step S1010. Further, the memory device 100 may apply an erase verify voltage to the first pass chunk block and the second pass chunk block that are included in the merged memory block at step S1020.

Then, the memory device 100 may determine whether the erase operation on the merged memory block has passed or failed at step S1030.

In a detailed embodiment, the memory controller 200 may receive an erase command and a logical address from the host system 20. It is assumed that the logical address corresponds to a block address indicating the merged memory block. Also, it is assumed that the merged memory block includes a first pass chunk block of a first memory block and a second pass chunk block of a second memory block.

In this case, the processor 230 of the memory controller 200 may transmit an erase command and a block address to the memory device 100, wherein the erase command is configured to perform control such that a first erase voltage is applied to the first memory block including the first pass chunk block and to the second memory block including the second pass chunk block and thereafter the erase verify voltage is sequentially applied to the first memory block and the second memory block.

When the erase command and the block address are received from the memory controller 200, the operation controller 131 of the memory device 100 may control the address decoder 121 so that the first erase voltage is applied to the first pass chunk block and the second pass chunk block that are included in the merged memory block at step S1010. In parallel with the application of the first erase voltage, the operation controller 131 may control the address decoder 121 so that the second erase voltage is applied to a first substrate of the first memory block including the first pass chunk block and to a second substrate of the second memory block including the second pass chunk block. In this case, the address decoder 121 may apply the second erase voltage to the first substrate and the second substrate while applying the first erase voltage to word lines coupled to the first memory block and the second memory block.

Further, the operation controller 131 may control the address decoder 121 so that the erase verify voltage is applied to the first pass chunk block and the second pass chunk block. In this case, the address decoder 121 may apply the erase verify voltage to the first word lines coupled to the first pass chunk block, and thereafter sequentially apply the erase verify voltage to the second word lines coupled to the second pass chunk block.

Also, the operation controller 131 may determine whether the erase operation on the merged memory block has passed or failed. For example, after the erase verify voltage is applied to the first memory block including the first pass chunk block, the operation controller 131 may determine whether the erase operation on the first pass chunk block has passed or failed depending on the result of comparing a first sensing voltage, which is sensed from the first page buffer block coupled to the first pass chunk block through the sensing circuit 125, with a reference voltage. Further, after the erase verify voltage is applied to the second memory block including the second pass chunk block, the operation controller 131 may determine whether the erase operation on the second pass chunk block has passed or failed depending on the result of comparing a second sensing voltage, which is sensed from the second page buffer block coupled to the second pass chunk block through the sensing circuit 125, with the reference voltage. The operation controller 131 may output a pass or fail signal PASS or FAIL for the erase operation on the first pass chunk block and the second pass chunk block to the memory controller 200.

Figure 11:
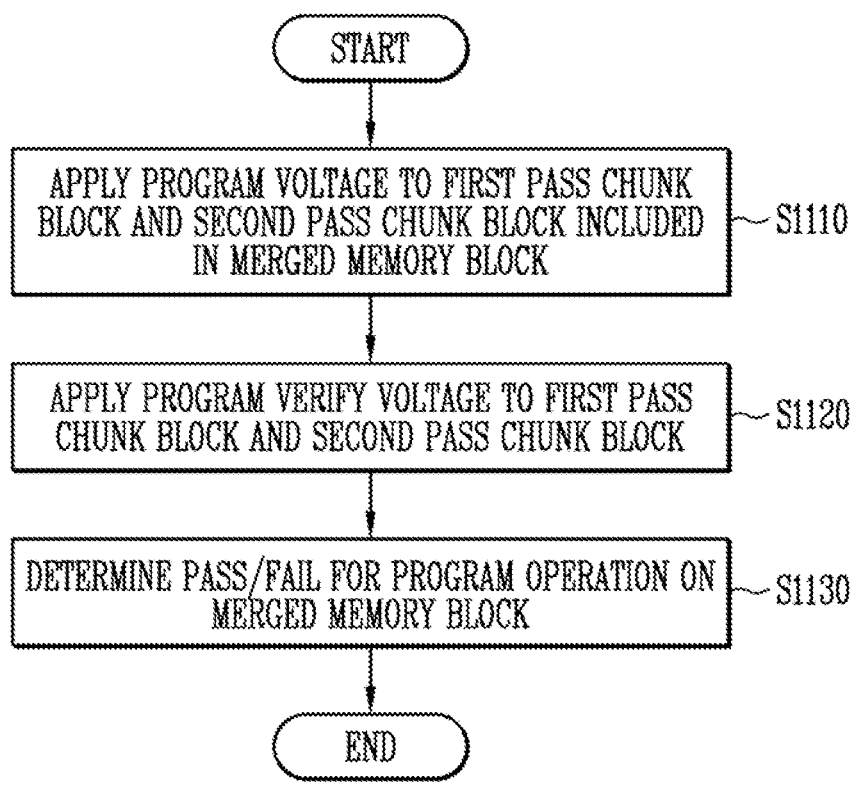
FIG. 11 is a flowchart illustrating a method of performing a program operation on a merged memory block according to an embodiment.

FIG. 11 is a flowchart illustrating a method of performing a program operation on a merged memory block according to an embodiment.

Referring to FIG. 11, when a program command is received, the memory device 100 may apply a program voltage to a first pass chunk block and a second pass chunk block that are included in a merged memory block at step S1110. Further, the memory device 100 may apply a program verify voltage to the first pass chunk block and the second pass chunk block that are included in the merged memory block at step S1120. Then, the memory device 100 may determine whether the program operation on the merged memory block has passed or failed at step S1130.

In a detailed embodiment, the memory controller 200 may receive a program command, a logical address, and page data from the host system 20. Here, the logical address is assumed to correspond to a page address indicating one of pages included in the merged memory block. Further, it is assumed that the merged memory block includes the first pass chunk block of a first memory block and the second pass chunk block of a second memory block and that one page is composed of a first chunk included in the first pass chunk block and a second chunk included in the second pass chunk block.

In this case, the processor 230 of the memory controller 200 may transmit a program command, a block address, and page data to the memory device 100, wherein the program command is configured to perform control such that a program voltage is sequentially applied to the first chunk of the first pass chunk block and the second chunk of the second pass chunk block, and thereafter a program verify voltage is sequentially applied to the first chunk of the first pass chunk block and the second chunk of the second pass chunk block. Furthermore, the operation controller 131 of the memory device 100 may receive the program command and the page address, and the data input/output circuit 124 of the memory device 100 may receive the page data and transfer the page data to the read and write circuit 123. Here, the first chunk data and the second chunk data into which the page data is divided may be respectively stored in the first page buffer group and the second page buffer group of the read and write circuit 123.

The operation controller 131 may control the address decoder 121 so that the program voltage is sequentially applied to the first chunk of the first pass chunk block and the second chunk of the second pass chunk block that are included in the merged memory block. In this case, the address decoder 121 may apply the program voltage to a first word line coupled to the first chunk. Here, a signal corresponding to the first chunk data may be transferred from the first page buffer group to the first chunk. Thereafter, the program voltage may be applied to a second word line coupled to the second chunk. In this case, a signal corresponding to the second chunk data may be transferred from the second page buffer group to the second chunk.

Also, the operation controller 131 may control the address decoder 121 so that the program verify voltage is sequentially applied to the first chunk of the first pass chunk block and the second chunk of the second pass chunk block that are included in the merged memory block. In this case, the address decoder 121 may apply the program verify voltage to a first word line coupled to the first chunk, and thereafter sequentially apply the program verify voltage to the second word line coupled to the second chunk.

Further, the operation controller 131 may determine whether the program operation on the first chunk of the first pass chunk block and the second chunk of the second pass chunk block that are included in the merged memory block has passed or failed.

For example, after the program verify voltage is applied to the first word line coupled to the first chunk of the first pass chunk block, the operation controller 131 may determine whether the program operation on the first chunk has passed or failed based on the result of comparing a first sensing voltage, which is sensed from the first page buffer block coupled to the first chunk through the sensing circuit 125, with a reference voltage. In this case, after the program verify voltage is applied to the second word line coupled to the second chunk of the second pass chunk block, the operation controller 131 may determine whether the program operation on the second chunk has passed or failed based on the result of comparing a second sensing voltage, which is sensed from the second page buffer block coupled to the second chunk through the sensing circuit 125, with the reference voltage.

Furthermore, the operation controller 131 may output a pass or fail signal PASS or FAIL for the program operation on the first chunk and the second chunk to the memory controller 200.

Figure 12:
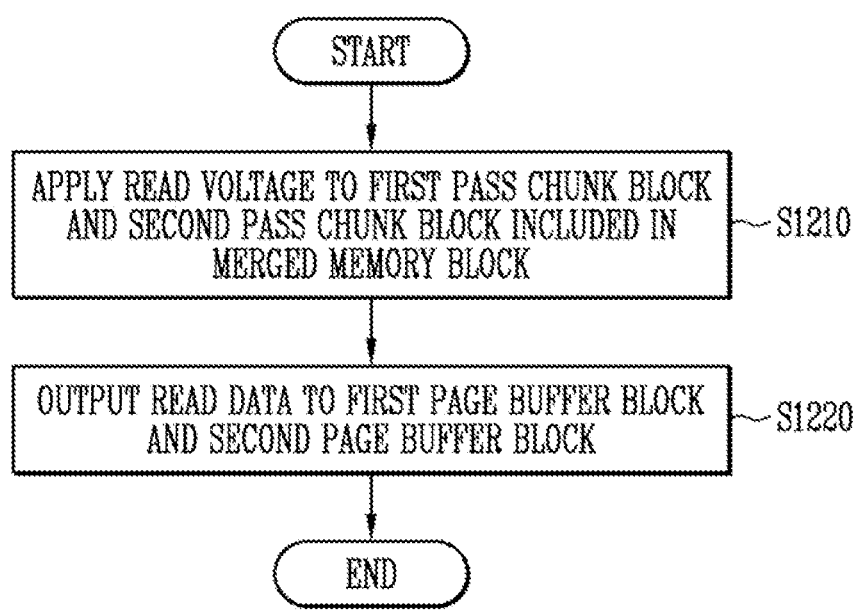
FIG. 12 is a flowchart illustrating a method of performing a read operation on a merged memory block according to an embodiment.

FIG. 12 is a flowchart illustrating a method of performing a read operation on a merged memory block according to an embodiment.

Referring to FIG. 12, when a read command is received, the memory device 100 may apply a read voltage to a first pass chunk block and a second pass chunk block that are included in a merged memory block at step S1210. Further, the memory device 100 may output read page data to a first page buffer block coupled to a first pass chunk block and a second page buffer block coupled to a second pass chunk block at step S1220. The page data may include the read first chunk data that is output to the first page buffer block and the read second chunk data that is output to the second page buffer block.

In a detailed embodiment, the memory controller 200 may receive a read command and a logical address from the host system 20. Here, the logical address is assumed to correspond to a page address indicating one of pages included in the merged memory block. Further, it is assumed that the merged memory block includes the first pass chunk block of a first memory block and the second pass chunk block of a second memory block and that one page is composed of a first chunk included in the first pass chunk block and a second chunk included in the second pass chunk block.

In this case, the processor 230 may transmit a read command and a page address to the memory device 100, wherein the read command is configured to perform control so that the read voltage is sequentially applied to the first chunk of the first pass chunk block and the second chunk of the second pass chunk block. Further, the operation controller 131 of the memory device 100 may receive the read command and the page address.

The operation controller 131 may control the address decoder 121 so that the read voltage is sequentially applied to the first chunk of the first pass chunk block and the second chunk of the second pass chunk block that are included in the merged memory block.

In this case, the address decoder 121 may apply the read voltage to a first word line coupled to the first chunk. Here, a signal corresponding to the first chunk data stored in the first chunk may be transferred to the first page buffer block coupled to the first chunk. Further, the address decoder 121 may apply a read voltage to a second word line coupled to the second chunk. Here, a signal corresponding to the second chunk data stored in the second chunk may be transferred to the second page buffer block coupled to the second chunk. The read first chunk data transferred to the first page buffer block and the read second chunk data transferred to the second page buffer block may form one piece of page data. The page data stored together in the first page buffer block and the second page buffer block may be output to the memory controller 200 through the data input/output circuit 124.

Figure 13:
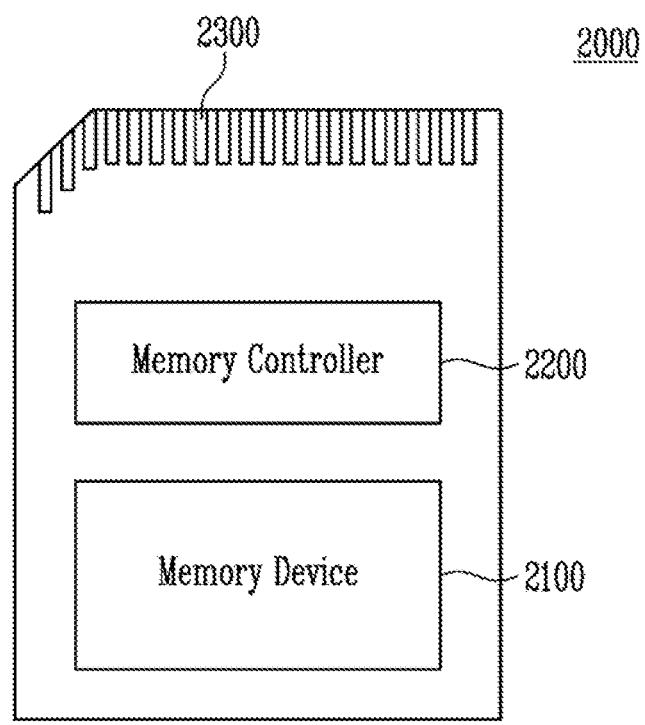
FIG. 13 is a block diagram illustrating a memory card to which a memory system according to an embodiment is applied.

FIG. 13 is a block diagram illustrating a memory card to which a memory system according to an embodiment is applied.

Referring to FIG. 13, a memory card 2000 may include a memory device 2100, a memory controller 2200, and a connector 2300.

The memory device 2100 may perform a program operation of storing data, a read operation of reading data, or an erase operation of erasing data. In an embodiment, the memory device 2100 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM). The description of the memory device 100, made above with reference to FIG. 1, may be equally applied to the memory device 2100, and repeated descriptions thereof will be omitted.

The memory controller 2200 may control the memory device 2100. For example, the memory controller 2200 may execute an instruction for controlling the memory device 2100. The memory controller 2200 may control the memory device 2100 to perform a program operation, a read operation, or an erase operation. The memory controller 2200 may transfer data, a command, or the like between the memory device 2100 and a host through communication. In an embodiment, the memory controller 2200 may include components, such as a RAM, a processor, a host interface, a memory interface, and an error correction circuit. The description of the memory controller 200, made above with reference to FIG. 1, may be equally applied to the memory controller 2200, and repeated descriptions thereof will be omitted below.

The memory controller 2200 may communicate with an external device through the connector 2300. The memory controller 2200 may communicate with an external device (e.g., a host) based on a specific communication protocol. In an embodiment, the memory controller 2200 may communicate with the external device through at least one of various interface protocols such as universal serial bus (USB), multimedia card (MMC), embedded MMC (eMMC), peripheral component interconnection (PCI), PCI-express (PCI-E), an advanced technology attachment (ATA) protocol, a serial-ATA (SATA), parallel-ATA (PATA), small computer system interface (SCSI), enhanced small disk interface (ESDI), integrated drive electronics (IDE), firewire, universal flash storage (UFS), WIFI, Bluetooth, and nonvolatile memory express (NVMe) protocols. In an embodiment, the connector 2300 may be defined by at least one of the above-described various communication protocols. The memory device 2100 and the memory controller 2200 may be integrated into a single semiconductor device to form the memory card. For example, the memory device 2100 and the memory controller 2200 may be integrated into a single semiconductor device, and may then form a memory card such as a PC card (i.e., personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 14:
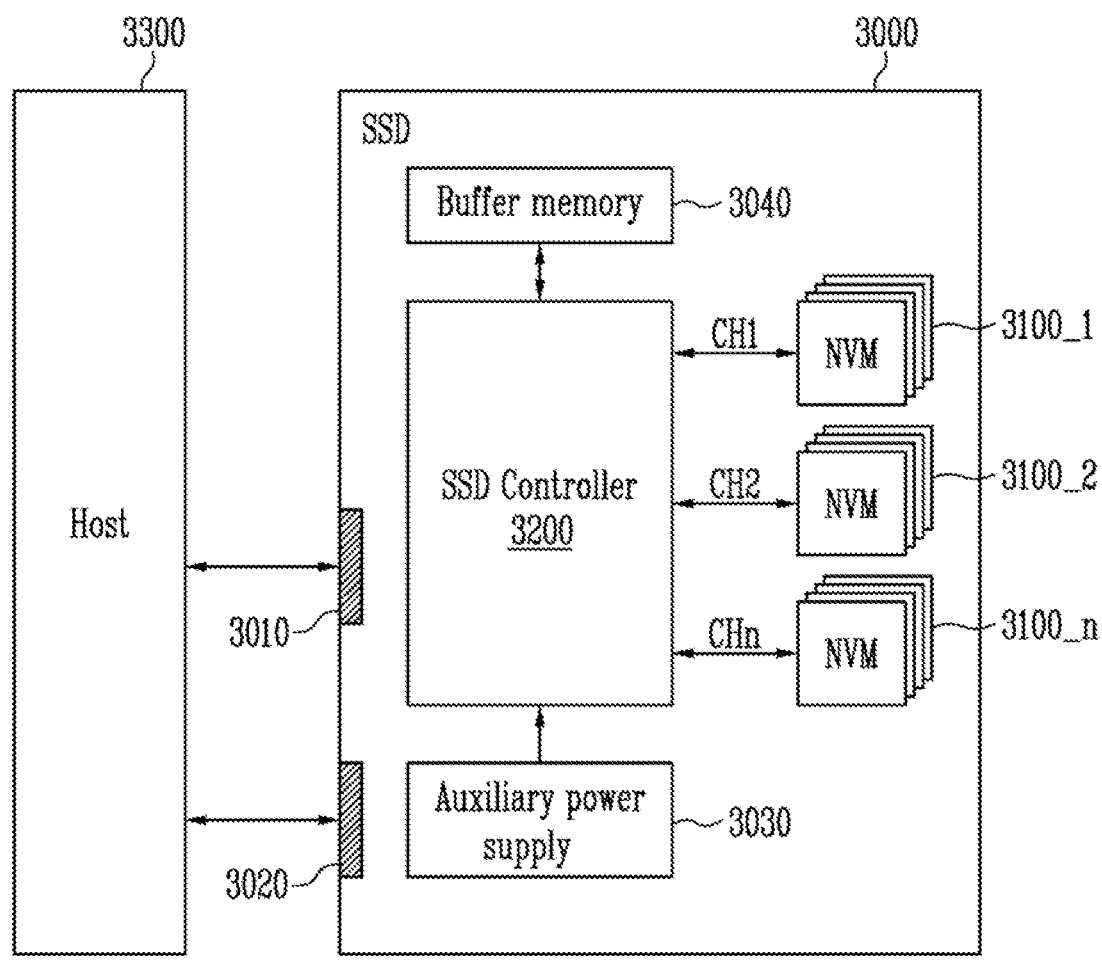
FIG. 14 is a block diagram illustrating a solid state drive (SSD) system to which a memory system according to an embodiment is applied.

FIG. 14 is a block diagram illustrating a solid state drive (SSD) system to which a memory system according to an embodiment is applied.

Referring to FIG. 14, an SSD system 3000 may include a plurality of nonvolatile memories 3100_1 to 3100_n, an SSD controller 3200, a signal connector 3010, an auxiliary power supply 3030, and a buffer memory 3040.

The SSD system 3000 may communicate with a host 3300 through the signal connector 3010. The signal connector 3010 may be implemented in the form of an interface complying with any of various communication methods. For example, the signal connector 3010 may be one of interfaces complying with various communication methods, such as a Serial ATA (SATA) interface, a mini-SATA (mSATA) interface, a PCI Express (PCIe) interface, and an M.2 interface.

The description of the memory device 100, made above with reference to FIG. 1, may be equally applied to each of the plurality of nonvolatile memories 3100_1 to 3100_n, and repeated descriptions thereof will be omitted below. The description of the memory controller 200, made above with reference to FIG. 1, may be equally applied to the SSD controller 3200, and repeated descriptions thereof will be omitted below.

The SSD system 3000 may be supplied with external power from the host 3300 through a power connector 3020. The auxiliary power supply 3030 may be coupled to the host 3300 through the power connector 3020. The auxiliary power supply 3030 may be supplied with power from the host 3300, and may be charged. The auxiliary power supply 3030 may supply the power of the SSD system 3000 when the supply of power from the host 3300 is not performed correctly. In an embodiment, the auxiliary power supply 3030 may be located inside the SSD system 3000 or located outside the SSD system 3000. For example, the auxiliary power supply 3030 may be located in a main board, and may also provide auxiliary power to the SSD system 3000.

The buffer memory 3040 may function as a buffer memory of the SSD system 3000. For example, the buffer memory 3040 may temporarily store data received from the host 3300 or data received from the plurality of nonvolatile memories 3100_1 to 3100_n, or may temporarily store metadata (e.g., mapping tables) of the nonvolatile memories 3100_1 to 3100_n. The buffer memory 3040 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 15:
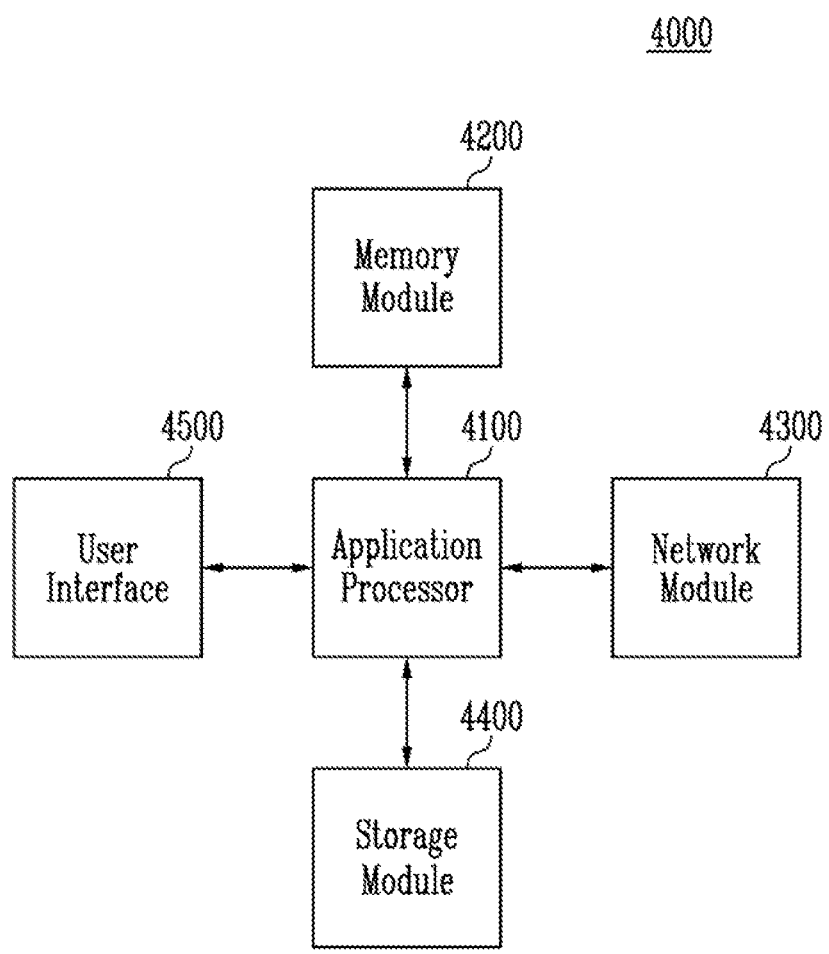
FIG. 15 is a block diagram illustrating a user system to which a memory system according to an embodiment is applied.

FIG. 15 is a block diagram illustrating a user system to which a memory system according to an embodiment is applied.

Referring to FIG. 15, a user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided in the form of a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDARM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as code division multiple access (CDMA), global system for mobile communication (GSM), wideband CDMA (WCDMA), CDMA-2000, time division multiple access (TDMA), long term evolution (LTE), Wimax, wireless LAN (WLAN), UWB, Bluetooth, or WiFi. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a 3D structure. In an embodiment, the storage module 4400 may be provided as a removable storage medium (removable drive), such as a memory card or an external drive of the user system 4000.

In an embodiment, the description of the memory system 10, made above with reference to FIG. 1, may be equally applied to the storage module 4400. For example, the storage module 4400 may include a plurality of nonvolatile memory devices. Here, the description of the memory device 100, made with reference to FIG. 1, may be equally applied to each of the plurality of nonvolatile memory devices.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as an a liquid crystal display (LCD), an organic light-emitting diode (OLED) display device, an active matrix OLED (AMOLED) display device, an LED, a speaker, and a monitor.

The present disclosure may provide a memory device that is capable of increasing the available capacity of a memory block and a memory system having the memory device. The present disclosure may provide a memory device that is capable of increasing the available capacity of a memory block without requiring a separate reserved memory block, and a memory system having the memory device.

What is claimed is:

1. A memory system, comprising:
    a memory device including a plurality of memory blocks, each including chunk blocks, and page buffer blocks respectively coupled to the chunk blocks; and
    a memory controller configured to, based on chunk block status information indicating whether each of the chunk blocks is one of a pass chunk block and a bad chunk block, control the memory device to perform an operation corresponding to a command on merged pass chunk blocks obtained by merging pass chunk blocks coupled to different page buffer blocks among pass chunk blocks included in memory blocks, each of the memory blocks including both the pass chunk block and the bad chunk block.

2. The memory system according to claim 1, wherein the page buffer blocks include a first page buffer block and a second page buffer block, and
    wherein the merged pass chunk blocks include a first pass chunk block coupled to the first page buffer block and a second pass chunk block coupled to the second page buffer block.

3. The memory system according to claim 2, wherein the memory controller comprises:
    a processor configured to, when the command is an erase command, control the memory device to apply an erase voltage in parallel to a first memory block including the first pass chunk block and to a second memory block including the second pass chunk block, among the plurality of memory blocks, and to sequentially apply an erase verify voltage to the first memory block and the second memory block.

4. The memory system according to claim 2, wherein the memory controller comprises:
    a processor configured to, when the command is a program command, control the memory device to sequentially apply a program voltage to a first memory block including the first pass chunk block and a second memory block including the second pass chunk block, among the plurality of memory blocks, and a program verify voltage is sequentially applied to the first memory block and the second memory block.

5. The memory system according to claim 2, wherein the memory controller comprises:
    a processor configured to, when the command is a read command, control the memory device to sequentially apply a read voltage to a first memory block including the first pass chunk block and a second memory block including the second pass chunk block, among the plurality of memory blocks.

6. The memory system according to claim 1, wherein the memory controller comprises:
    a block status register configured to store at least one of an identifier of chunk blocks included in each of the memory blocks, the chunk block status information, an identifier of chunks included in each of the chunk blocks, and chunk status information indicating whether each of the chunks is one of a pass chunk in which recoverable data is stored and a bad chunk in which unrecoverable data is stored.

7. The memory system according to claim 6, wherein the memory controller further comprises:
    a block merge manager configured to, based on the chunk block status information stored in the block status register, assign an address indicating one memory block to the merged pass chunk blocks and store the address in the block status register; and
    a processor configured to, when the command and a logical address corresponding to the address are received from a host, control the memory device to perform an operation corresponding to the command on the merged pass chunk blocks,
    wherein the command is one of an erase command, a program command, and a read command.

8. The memory system according to claim 1, wherein the memory controller comprises:
   a processor configured to control the memory device so that a read operation of reading pieces of data stored in chunks coupled to a selected word line, among chunks included in the chunk blocks, is performed; and
   an error correction circuit configured to perform an error correction operation of correcting error bits respectively included in pieces of data acquired through the read operation; and
   a block merge manager configured to determine that a chunk in which data having failed in the error correction operation, among the pieces of data, is stored as a bad chunk and determine that a chunk in which data having passed the error correction operation, among the pieces of data, is stored as a pass chunk.

9. The memory system according to claim 8, wherein the block merge manager is configured to, when a number of bad chunks included in a selected chunk block among the chunk blocks is equal to or greater than a reference number of bad chunk, determine that the selected chunk block is the bad chunk block, and when the number of bad chunks included in the selected chunk block among the chunk blocks is less than the reference number of bad chunks, determine that the selected chunk block is the pass chunk block.

10. The memory system according to claim 1, wherein the memory controller comprises:
    a processor configured to control the memory device to perform a program operation of storing pieces of data in chunks coupled to a selected word line, among chunks included in the chunk blocks; and
    a block merge manager configured to determine that a chunk having failed in the program operation, among the chunks, is a bad chunk and determine that a chunk having passed the program operation is a pass chunk.

11. A memory device, comprising:
    a plurality of memory blocks, each including chunk blocks, each of the chunk blocks comprising one of a pass chunk block and a bad chunk block;
    page buffer blocks coupled to the chunk blocks, respectively;
    an address decoder configured to apply an operating voltage to a memory block selected from among the plurality of memory blocks;
    a block register configured to store a block address corresponding to merged pass chunk blocks obtained by merging pass chunk blocks coupled to different page buffer blocks, among pass chunk blocks included in memory blocks, each including both the pass chunk block and the bad chunk block; and
    an operation controller configured to, when a command and the block address are received from a memory controller, control the address decoder to apply an operating voltage corresponding to the command to the merged pass chunk blocks selected by the block address.

12. The memory device according to claim 11, wherein the page buffer blocks include a first page buffer block and a second page buffer block, and wherein the merged pass chunk blocks include a first pass chunk block coupled to the first page buffer and a second pass chunk block coupled to the second page buffer block.

13. The memory device according to claim 12, wherein the operation controller is configured to, when the command is an erase command, control the address decoder to apply an erase voltage in parallel to a first memory block including the first pass chunk block and to a second memory block including the second pass chunk block, among the plurality of memory blocks, and to sequentially apply an erase verify voltage to the first memory block and the second memory block.

14. The memory device according to claim 12, wherein the operation controller is configured to, when the command is a program command, control the address decoder to sequentially apply a program voltage to a first memory block including the first pass chunk block and a second memory block including the second pass chunk block, among the plurality of memory blocks, and to sequentially apply a program verify voltage to the first memory block and the second memory block.

15. The memory device according to claim 12, wherein the operation controller is configured to, when the command is a read command, control the address decoder to sequentially apply a read voltage to a first memory block including the first pass chunk block and a second memory block including the second pass chunk block, among the plurality of memory blocks.

16. The memory device according to claim 11, wherein the block register is configured to store at least one of an identifier of chunk blocks included in each of the memory blocks, the chunk block status information, an identifier of chunks included in each of the chunk blocks, and chunk status information indicating whether each of the chunks is one of a pass chunk in which recoverable data is stored and a bad chunk in which unrecoverable data is stored.

17. The memory device according to claim 11, further comprising:
    a block manager configured to, based on the chunk block status information stored in the block register, assign the address indicating one memory block to the merged pass chunk blocks and store the address in the block register.

18. The memory device according to claim 11, wherein:
    each of the plurality of memory blocks comprises a plurality of pages coupled to different word lines, and
    each of the plurality of pages comprises chunks coupled to a corresponding word line among chunks included in each of the chunk blocks, respectively.

19. The memory device according to claim 11, wherein:
    the operation controller is configured to, when a program command, an address, and chunk data are received from the memory controller, control the address decoder to repeatedly perform a program loop operation of sequentially applying a program voltage and a program verify voltage to chunks coupled in common to a word line selected by the address, among chunks included in the chunk blocks, and
    the memory device comprises:
    a block manager configured to, among the chunks to which the program verify voltage is applied, determine a chunk which outputs the chunk data while a number of times that the program loop operation is performed is within a reference number of times, to be a pass chunk, and determine a chunk which outputs data non-matching the chunk data while the number of times that the program loop operation is performed is within the reference number of times, to be a bad chunk.

* * * * *